US008738792B2

(12) United States Patent
Carlson et al.

(10) Patent No.: US 8,738,792 B2
(45) Date of Patent: May 27, 2014

(54) SERVER TIME PROTOCOL MESSAGES AND METHODS

(75) Inventors: Scott M. Carlson, Tucson, AZ (US); Donald Crabtree, Port Ewen, NY (US); Dennis J. Dahlen, Rhinebeck, NY (US); Noshir R. Dhondy, Saugerties, NY (US); Michael H.T. Hack, Cortlandt Manor, NY (US); Denise M. Sevigny, Wappingers Falls, NY (US); Ronald M. Smith, Sr., Wappingers Falls, NY (US); Judith A. Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 11/940,518

(22) Filed: Nov. 15, 2007

(65) Prior Publication Data

US 2008/0183899 A1    Jul. 31, 2008

Related U.S. Application Data

(60) Provisional application No. 60/887,512, filed on Jan. 31, 2007.

(51) Int. Cl.
*G06F 15/16*     (2006.01)
*G06F 15/177*    (2006.01)
*G06F 15/173*    (2006.01)

(52) U.S. Cl.
USPC ............ 709/230; 709/222; 709/223; 709/248

(58) Field of Classification Search
USPC ................. 709/230, 212, 239, 222, 223, 248; 370/352, 436, 475
See application file for complete search history.

(56) References Cited

U.S. PATENT DOCUMENTS

| 4,894,846 A | 1/1990 | Fine |
| 5,481,258 A | 1/1996 | Fawcett et al. |

(Continued)

FOREIGN PATENT DOCUMENTS

| JP | 11184825 A | 7/1999 |
| JP | 2000-155729 A | 6/2000 |

(Continued)

OTHER PUBLICATIONS

Mills, D.L.: "Internet Time Synchronization: The Network Time Protocol," IEEE Transactions on Communications, IEEE Service Center, Piscataway, NJ, US, vol. 39, No. 10, Oct. 1, 1991, pp. 1482-1493, XP000275311, ISSN: 0090-6778.

(Continued)

*Primary Examiner* — Asad Nawaz
*Assistant Examiner* — Stephanie Chang
(74) *Attorney, Agent, or Firm* — John E. Campbell; Kevin P. Radigan, Esq.; Heslin Rothenberg Farley & Mesiti P.C.

(57) ABSTRACT

Server time protocol (STP) messages and methods of exchange thereof are provided for facilitating synchronization of processing units of a timing network. The STP messages include exchange time parameters (XTP) commands and responses, and STP control (STC) commands and responses. XTP message exchange processing includes: generating an XTP message command at a first processing unit including a command transmit timestamp field set by the first processing unit and a command receive timestamp field which is unset by the first processing unit; transmitting the XTP message command to a second processing unit; setting the command receive timestamp field in the XTP command with the time the XTP command is received at the second processing unit; and generating an XTP message response at the second processing unit, the message response including the command transmit timestamp set by the first processing unit and the command receive timestamp set by the second processing unit.

17 Claims, 16 Drawing Sheets

(56) References Cited

U.S. PATENT DOCUMENTS

| | | | |
|---|---|---|---|
| 5,602,992 A | 2/1997 | Danneels | |
| 5,636,373 A | 6/1997 | Glendening et al. | |
| 5,689,688 A | 11/1997 | Strong et al. | |
| 5,784,421 A | 7/1998 | Dolev et al. | |
| 5,812,749 A | 9/1998 | Fernandez et al. | |
| 5,848,028 A | 12/1998 | Burklin | |
| 5,925,107 A | 7/1999 | Bartfai et al. | |
| 5,968,133 A | 10/1999 | Latham et al. | |
| 6,173,023 B1 | 1/2001 | Tanonaka et al. | |
| 6,253,335 B1 | 6/2001 | Nakajima et al. | |
| 6,311,217 B1 | 10/2001 | Ehlinger et al. | |
| 6,351,821 B1* | 2/2002 | Voth | 713/600 |
| 6,535,491 B2 | 3/2003 | Gai et al. | |
| 6,591,370 B1 | 7/2003 | Lovett et al. | |
| 6,606,362 B1 | 8/2003 | Dalzell et al. | |
| 6,618,166 B1 | 9/2003 | Suzue | |
| 6,636,987 B1 | 10/2003 | Ruffini | |
| 6,697,382 B1 | 2/2004 | Eatherton | |
| 6,704,801 B1 | 3/2004 | Minyard | |
| 6,714,563 B1 | 3/2004 | Kushi | |
| 6,742,044 B1 | 5/2004 | Aviani et al. | |
| 6,748,451 B2 | 6/2004 | Woods et al. | |
| 6,754,171 B1 | 6/2004 | Bernier et al. | |
| 6,760,316 B1 | 7/2004 | Hebsgaard et al. | |
| 6,768,452 B2 | 7/2004 | Gilkes | |
| 6,819,682 B1 | 11/2004 | Rabenko et al. | |
| 6,895,189 B1 | 5/2005 | Bedrosian | |
| 7,103,514 B1 | 9/2006 | Carlson et al. | |
| 7,139,346 B2 | 11/2006 | Skahan, Jr. et al. | |
| 7,146,504 B2 | 12/2006 | Parks et al. | |
| 7,185,111 B2 | 2/2007 | Fulghum et al. | |
| 7,283,568 B2 | 10/2007 | Robie et al. | |
| 7,356,725 B2 | 4/2008 | Engler | |
| 7,394,802 B2 | 7/2008 | Jun et al. | |
| 7,395,448 B2 | 7/2008 | Smith | |
| 7,448,061 B2 | 11/2008 | Richards et al. | |
| 7,454,648 B2 | 11/2008 | Dahlen | |
| 7,475,272 B2 | 1/2009 | Carlson | |
| 7,496,606 B2 | 2/2009 | Hind et al. | |
| 7,535,931 B1 | 5/2009 | Zampetti et al. | |
| 7,539,777 B1 | 5/2009 | Aitken | |
| 7,571,268 B2 | 8/2009 | Kern et al. | |
| 7,617,410 B2 | 11/2009 | Check et al. | |
| 7,688,865 B2 | 3/2010 | Carlson et al. | |
| 7,689,718 B2 | 3/2010 | Carlson et al. | |
| 7,926,096 B2 | 4/2011 | Ali et al. | |
| 2002/0027886 A1* | 3/2002 | Fischer et al. | 370/255 |
| 2002/0039370 A1 | 4/2002 | Elliot | |
| 2002/0073228 A1 | 6/2002 | Cognet et al. | |
| 2002/0078243 A1 | 6/2002 | Rich et al. | |
| 2002/0131370 A1 | 9/2002 | Chuah et al. | |
| 2002/0131398 A1 | 9/2002 | Taylor | |
| 2003/0035444 A1 | 2/2003 | Zwack | |
| 2003/0048811 A1 | 3/2003 | Robie et al. | |
| 2003/0152177 A1 | 8/2003 | Cahill-O'Brian et al. | |
| 2003/0200338 A1 | 10/2003 | Fulghum et al. | |
| 2003/0235216 A1 | 12/2003 | Gustin | |
| 2004/0073718 A1 | 4/2004 | Johannessen et al. | |
| 2004/0076187 A1 | 4/2004 | Peled | |
| 2004/0125822 A1 | 7/2004 | Jun et al. | |
| 2004/0167990 A1 | 8/2004 | Peer | |
| 2005/0020275 A1* | 1/2005 | Agrawala et al. | 455/456.1 |
| 2005/0033862 A1 | 2/2005 | Blum et al. | |
| 2005/0135429 A1 | 6/2005 | Bingham et al. | |
| 2005/0169233 A1 | 8/2005 | Kandala et al. | |
| 2007/0058491 A1 | 3/2007 | Dahlen et al. | |
| 2007/0086489 A1 | 4/2007 | Carlson | |
| 2007/0086490 A1 | 4/2007 | Carlson | |
| 2008/0028254 A1 | 1/2008 | Smith | |
| 2008/0059655 A1 | 3/2008 | Carlson | |
| 2008/0059808 A1 | 3/2008 | Engler | |
| 2008/0072096 A1 | 3/2008 | Smith | |
| 2008/0072097 A1 | 3/2008 | Check | |
| 2008/0162984 A1 | 7/2008 | Kalra et al. | |
| 2008/0183849 A1 | 7/2008 | Carlson | |
| 2008/0183877 A1 | 7/2008 | Carlson | |
| 2008/0183895 A1 | 7/2008 | Carlson | |
| 2008/0183896 A1 | 7/2008 | Carlson | |
| 2008/0183897 A1 | 7/2008 | Carlson et al. | |
| 2008/0183898 A1 | 7/2008 | Carlson | |
| 2008/0184060 A1 | 7/2008 | Carlson | |
| 2008/0225897 A1 | 9/2008 | Bryant et al. | |
| 2009/0070618 A1 | 3/2009 | Dahlen et al. | |
| 2009/0257456 A1 | 10/2009 | Carlson et al. | |
| 2009/0259881 A1 | 10/2009 | Carlson et al. | |
| 2010/0049818 A1 | 2/2010 | Walker | |
| 2010/0100761 A1 | 4/2010 | Carlson et al. | |
| 2010/0100762 A1 | 4/2010 | Carlson et al. | |

FOREIGN PATENT DOCUMENTS

| | | |
|---|---|---|
| JP | 2004-199366 A | 7/2004 |
| JP | 2005-100030 A | 4/2005 |
| JP | 2005-227192 A | 8/2005 |
| WO | 0195550 A2 | 12/2001 |
| WO | WO 01/95550 A2 | 12/2001 |
| WO | 02/44877 A1 | 6/2002 |
| WO | 03/036395 A1 | 5/2003 |

OTHER PUBLICATIONS

Liang L-S: "Time Server in Advanced Automation Local Area Netowrk," Computer Standards and Interfaces, Elsevier Sequoia, Lausanne, CH, vol. 6, No. 3, Jan. 1989, pp. 223-227, XP000112504, ISSN: 0920-5489.

Burbank J et al., "The Network Time Protocol Version 4 Protocol Specification; draft-ietf-ntp-ntpv4-proto-02.txt", IETF Standard-Working-Draft, Internet Engineering Task Force, IETF, CH, vol. ntp, No. 2, Mar. 2006.

International Search Report for PCT/EP2008/050482 dated Apr. 15, 2008.

"z/Architecture Principles of Operation," IBM Publication No. SA22-7832-04, Sep. 2005.

Kadoch, Michel, "ATM Signalling: A Tutorial," Canadian Conference on Electrical and Computer Engineering—Cones Canadien En Genie Electrique Et Infonnatique, vol. 1, Sep. 5, 1995; pp. 420-423, XP000618815; p. 421-p. 422.

Office Action for U.S. Appl. No. 11/940,558 dated Sep. 3, 2009.

PCT Notification of Transmittal of the International Search Report and the Written Opinion of the International Searching Authority, or the Declaration; International Application No. PCT/EP2008/050620.

PCT Notification of Transmittal of the International Search Report and the Written Opinion of the International Searching Authority, or the Declaration; International Application No. PCT/EP2008/050739.

PCT Notification of Transmittal of the International Search Report and the Written Opinion of the International Searching Authority, or the Declaration; International Application No. PCT/EP2008/050726.

PCT Notification of Transmittal of the International Search Report and the Written Opinion of the International Searching Authority, or the Declaration; International Application No. PCT/EP2008/050524.

Office Action for U.S. Appl. No. 11/876,152 dated Oct. 15, 2009.

Office Action for U.S. Appl. No. 11/876,199 dated Oct. 26, 2009.

Office Action for U.S. Appl. No. 11/876,240 dated Oct. 26, 2009.

Office Action for U.S. Appl. No. 11/876,272 dated Oct. 16, 2009.

Office Action for U.S. Appl. No. 12/541,485, dated Oct. 12, 2010.

Office Action for U.S. Appl. No. 12/100,872, dated Nov. 17, 2010.

Office Action for U.S. Appl. No. 12/782,144, dated Nov. 17, 2010.

Neville, Iain, IBM System Z Technical Conference, Apr. 2007, IBM Corporation.

Dhondy, Noshir, "Introduction to Server Time Protocol with IBM System and Technology Group," Oct. 9-13, 2006.

"Server Time Protocol for IBM Z9 System, zSeries 990 and 890; Non-Raised-Floor Support for System z9 BC," Oct. 2006.

Office Action for U.S. Appl. No. 11/876,240 dated Mar. 19, 2010.

U.S. Appl. No. 12/748,539, filed Mar. 29, 2010, entitled "Channel Subsystem Server Time Protocol Commands," Carlson et al.

Sun, Kun et al., "Fault-Tolerant Cluster-Wise Clock Synchronization for Wireless Sensor Networks," Jul.-Sep. 2005, IEEE Transactions on Dependable and Secure Computing, vol. 2, No. 3, pp. 177-189.

(56) References Cited

OTHER PUBLICATIONS

"z/Architecture Principles of Operation," IBM Publication No. SA22-7832-04, Fifth Edition, Sep. 2005.
"z/Architecture Principles of Operation," IBM Publication No. SA22-7832-06, Seventh Edition, Feb. 2008.
International Search Report and Written Opinion for PCT/EP2007/058910 dated Nov. 6, 2007.
Office Action for U.S. Appl. No. 11/468,352 dated Dec. 18, 2008.
Office Action for U.S. Appl. No. 11/468,352 dated Jun. 1, 2009.
Final Office Action for U.S. Appl. No. 11/468,352 dated Oct. 27, 2009.
Office Action for U.S. Appl. No. 11/468,352 dated Apr. 21, 2010.
Final Office Action for U.S. Appl. No. 11/876,240 dated Mar. 19, 2010.
Office Action for U.S. Appl. No. 12/100,660 dated Jul. 8, 2010.
Office Action for U.S. Appl. No. 12/100,872 dated May 28, 2010.
U.S. Appl. No. 12/748,539 entitled "Channel Subsystem Server Time Protocol Commands," Carlson et al., filed Mar. 29, 2010.
U.S. Appl. No. 12/782,144 entitled "Server Time Protocol Control Messages and Methods," Carlson et al., filed May 18, 2010.
Office Action for U.S. Appl. No. 12/748,539 dated Aug. 19, 2011.
Carlson et al., Office Action for U.S. Appl. No. 11/876,240, filed Oct. 22, 2007 (U.S. Patent Publication No. 2008/0183897 A1), dated Oct. 4, 2013 (34 pages).
Carlson et al., Office Action for U.S. Appl. No. 13/888,506, filed May 7, 2013 (U.S. Patent Publication No. 2013/0254478 A1), dated Oct. 22, 2013 (5 pages).
Final Office Action for U.S. Appl. No. 11/876,240 (U.S. Publication No. 2008/0183897 A1), dated Apr. 10, 2012.
Carlson et al., Notice of Allowance for U.S. Appl. No. 12/100,872, filed Apr. 10, 2008, (U.S. Application Publication No. US 2009/0257456 A1), dated May 11, 2012.
Trowel et al., S/390 Time Management and IBM 9037 Sysplex Timer, 1999.
Office Action for U.S. Appl. No. 11/876,240 (U.S. Publication No. 2008/0183897 A1), dated Sep. 12, 2011.

\* cited by examiner

1500

NEW STRATUM-1 CONFIGURATION INFORMATION BLOCK

FIG. 15

| 1610 | 1620 |
|---|---|
| CTN PARAMETER CODE | CTN PARAMETER KEY |
| CTN PARAMETER DATA AREA ||

| 1660 | PRT CORRECTION STEERING INFORMATION BLOCK (PCSIB) |
|---|---|
| | NEW CTN ID BLOCK |
| | LEAP SECOND OFFSET INFORMATION BLOCK (LSOIB) |

SERVER TIME PROTOCOL MESSAGES AND METHODS

CROSS-REFERENCE TO RELATED APPLICATIONS

This application claims priority to U.S. Provisional Application No. 60/887,512, entitled "Server Time Protocol Messages and Methods", filed Jan. 31, 2007, which is hereby incorporated herein by reference in its entirety.

TECHNICAL FIELD

This invention relates in general to time synchronization within and across a network of processing units, and more particularly, to server time protocol messages and methods that facilitate servers in a timing network synchronizing, for example, to a same root primary reference time.

BACKGROUND OF THE INVENTION

For performance and data integrity reasons, computing systems that access shared data, such as SYSPLEX offered by International Business Machines Corporation, Armonk, N.Y., must be able to maintain time of day (TOD) clock synchronization to an accuracy that is better than best case communication time between the systems. Currently, in one example, to meet the synchronization requirements, a timer, such as the IBM® 9037 SYSPLEX timer, is used. This timer requires expensive dedicated timing links and a separate external box.

Other networks, such as the Network Timing Protocol (NTP), provide time synchronization, but do not meet the accuracy requirements of high-end systems. NTP requires that each server has access to an external time source that provides accuracy to a microsecond level in order to ensure all servers synchronize to the same reference time. This is a problem for those systems that do not have a capability to attach to external time servers that provide this level of accuracy. Further, a requirement of GPS receivers or similar attachment on each system may be considered infeasible for maintenance, security and reliability reasons.

SUMMARY OF THE INVENTION

The shortcomings of the prior art are overcome and additional advantages are provided through the provision of a method of exchanging messages for facilitating synchronization of processing units of a timing network. The method includes: generating an exchange time parameters (XTP) message command at a first processing unit, the XTP message command including a message command transmit timestamp field set by the first processing unit and a message command receive timestamp field which is unset by the first processing unit; transmitting the XTP message command to a second processing unit; setting the message command receive timestamp field in the XTP message command with the time that the XTP message command is received at the second processing unit; and generating an XTP message response at the second processing unit, the XTP message response including the message command transmit timestamp set by the first processing unit and the message command receive timestamp set by the second processing unit obtained from the XTP message command.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 15 depicts one embodiment of a new stratum-1 configuration information block, in accordance with an aspect of the present invention;

FIG. 16A depicts one example of a read-CTN-parameter response in an operation-dependent area format, in accordance with an aspect of the present invention;

FIG. 16B depicts one example of a read-CTN-parameters-general-parameters data area format, in accordance with an aspect of the present invention;

BEST MODE FOR CARRYING OUT THE INVENTION

Figure 1A:
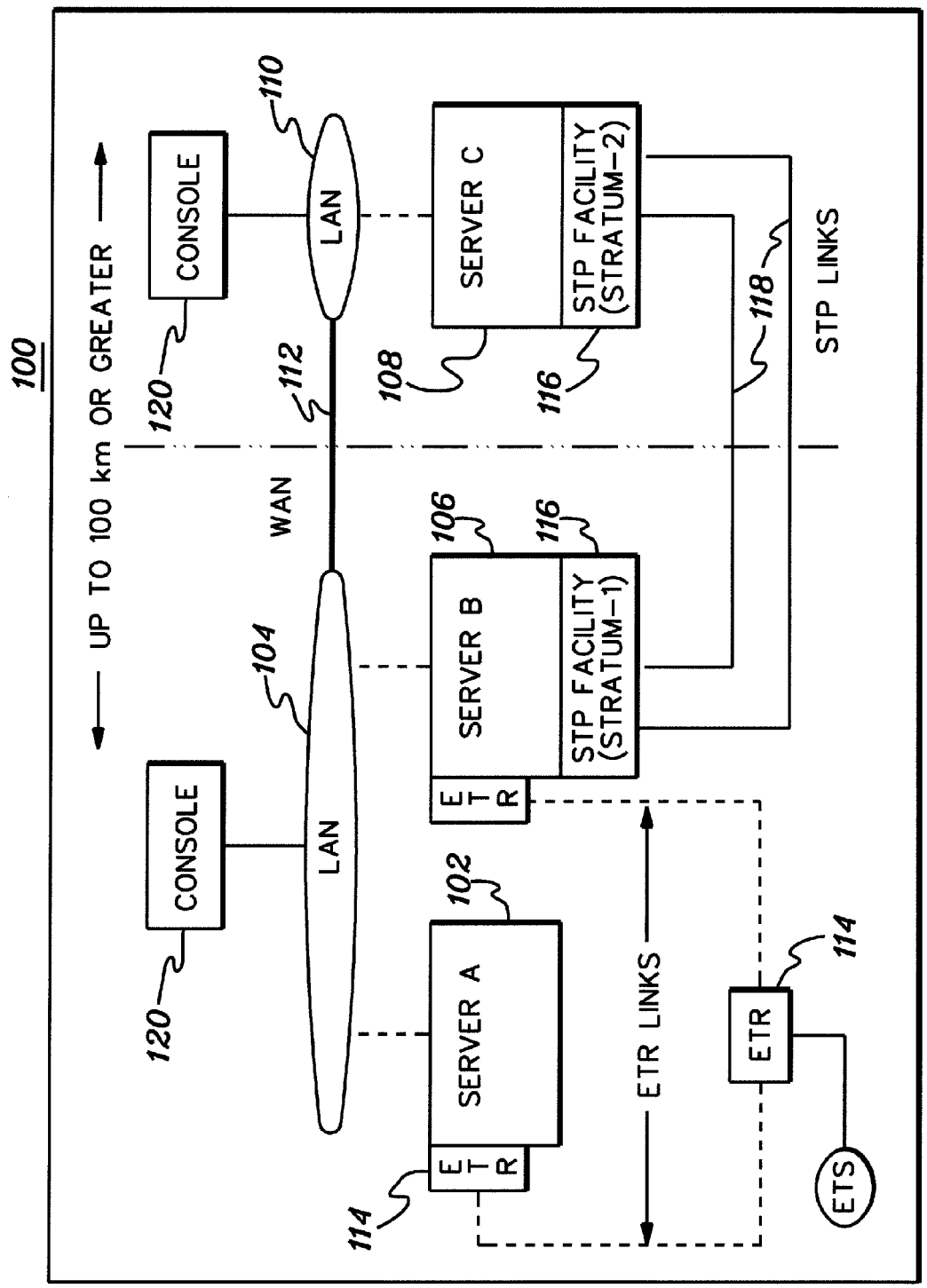
FIG. 1A depicts one example of a mixed coordinated timing network to incorporate one or more aspects of the present invention.

In accordance with an aspect of the present invention, server time protocol (STP) messages and processing methods employing the same are provided for, for example, transferring timing information between two servers in a timing network to facilitate synchronization thereof. Exchange time parameters (XTP) messages and STP control (STC) messages are described.

Although various networks can be configured to include a stratum-1 server, one such network is a Coordinated Timing Network (CTN). In a Coordinated Timing Network, multiple distinct computing systems maintain time synchronization to form the Coordinated Timing Network. Systems in the Coordinated Timing Network employ a message based protocol, referred to as a Server Time Protocol (STP), to pass timekeeping information between the systems over existing, high-speed data links. This enables the time of day (TOD) clocks at each system to be synchronized to the accuracy required in today's high-end computing systems. Since the protocol makes use of technology within a computing system, synchronization accuracy scales as technology improves. A computing system that provides an STP facility is referred to as a time server or server herein.

A server defined in a CTN as a primary time server provides primary reference time for the CTN. The server in a CTN that determines CST (an estimate of the time-of-day (TOD) clock for the CTN) based on information from another server in the CTN is referred to as the secondary time server. The primary time server may obtain its time from an external time source, which provides the means to synchronize the time of day clocks in a CTN to a defined time standard.

Servers in a CTN that are in the synchronized state are assigned a value, referred to as a stratum level, that specifies the number of servers between it and a primary time server. A primary time server operates at a stratum level of 1; secondary time servers operate at a stratum level of 2 or above, which increases as the number of servers in the timing path to the stratum-1 increases. In general, the quality of timekeeping information decreases as the stratum level increases. The server that is unsynchronized is assigned a stratum level of 0.

The STP facility provides the procedures required to transmit, receive and process STP messages. STP messages are transmitted over one or more physical data links between servers. The data link that has been established between two servers is referred to as an STP path. The STP facility provides the facilities to establish and maintain STP paths.

STP messages include a message command and a message response. Two types of STP messages are supported. The exchange time parameters (XTP) message and the STP control (STC) message. The XTP message is used to exchange the timekeeping information used to determine CST for the CTN. STP control messages are used to set and modify various CTN parameters required by servers in the CTN.

A CTN can operate, for instance, as one of two types of configurations: either as a mixed CTN configuration or as an STP-only CTN configuration. In a mixed CTN configuration, the servers are configured to be part of both an STP network and an External Time Reference (ETR) network. In a mixed CTN configuration, the servers in the CTN are configured with the same, non-null ETR network ID and a timer (e.g., 9037 SYSPLEX timer) provides the primary time reference for the CTN. At least one server in the CTN is to step to timing signals provided by the SYSPLEX timer before synchronization can occur within the CTN. Servers not stepping to the sysplex timer are secondary time servers and achieve synchronization by exchanging STP signals as described further below.

As one example, each server stepping to the timing signals of the SYSPLEX timer receives the time protocol parameters and propagates the information to secondary time servers in the CTN, using, for instance, a CTN parameter update procedure. An example of this procedure is described in U.S. Ser. No. 11/468,352, entitled "Coordinated Timing Network Configuration Parameter Update Procedure", Carlson et al., filed Aug. 30, 2006, which is hereby incorporated herein by reference in its entirety.

One example of a mixed CTN configuration 100 is described with reference to FIG. 1A. Mixed CTN configuration 100 includes, for instance, a Server A (102) coupled to a local area network (104), a Server B (106) coupled to local area network (104) and a Server C (108) coupled to a local area network (110). Each server is, for instance, a central processing complex based on the z/Architecture® offered by International Business Machines Corporation. z/Architecture® is a registered trademark of International Business Machines Corporation, Armonk, N.Y., USA. One embodiment of the z/Architecture® is described in "z/Architecture Principles of Operation," IBM Publication No. SA22-7832-04, September 2005, which is hereby incorporated herein by reference in its entirety.

Each local area network is coupled to a console 120 used in providing time synchronization within the network. Further, local area network 104 and local area network 110 are coupled to one another via a wide area network 112.

Servers A and B are coupled to an external time reference network 114, and Servers B and C are configured to be part of an STP network 116. Server B is at a stratum-1 level and Server C is at a stratum-2 level. STP links 118 are used to couple the STP facility of Server B with the STP facility of Server C.

Figure 1B:
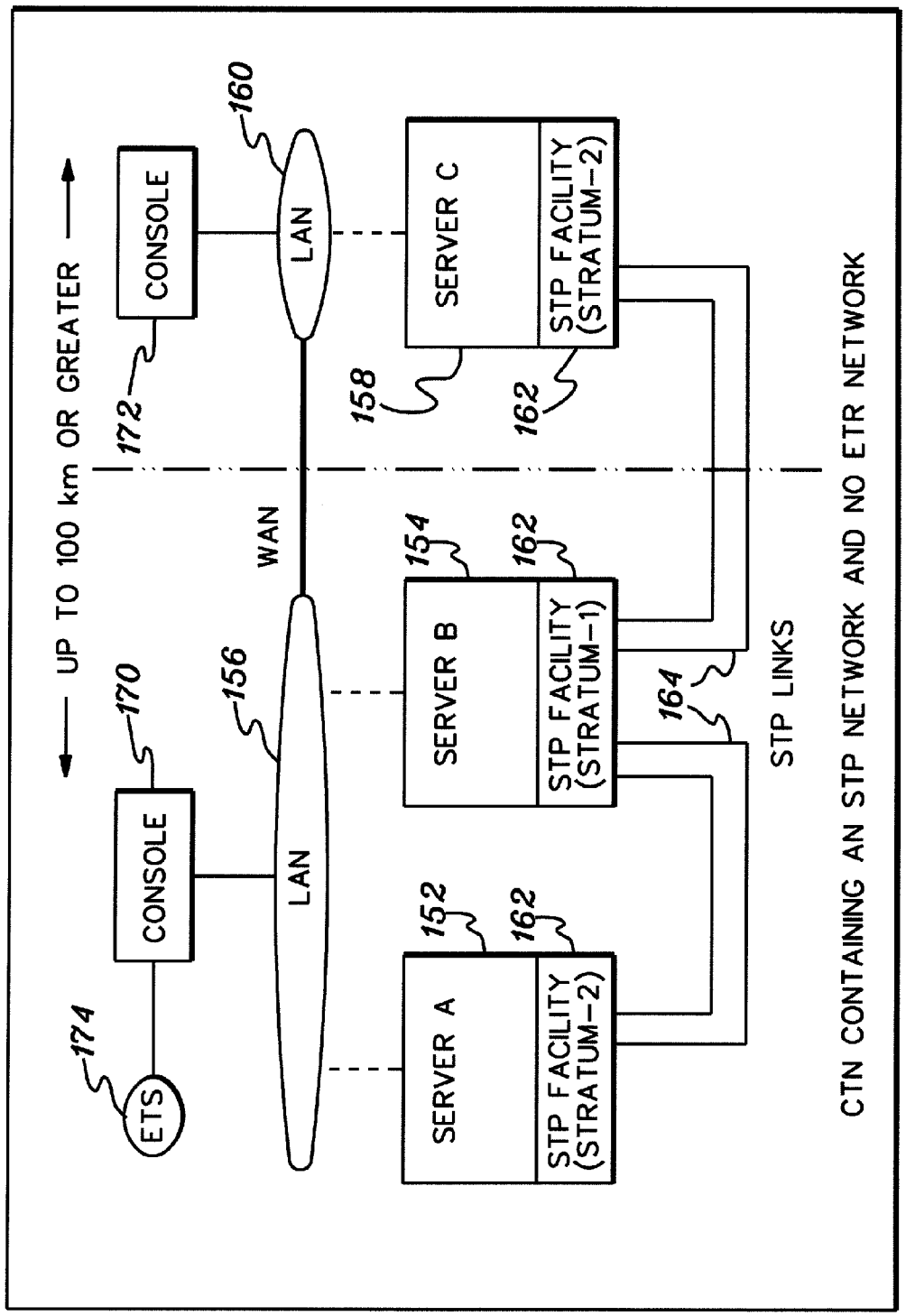
FIG. 1B depicts one example of an STP-only network to incorporate one or more aspects of the present invention.

In an STP-only CTN, the servers in the CTN are configured to be part of an STP network and none are configured to be part of an ETR network. One example of an STP-only network 150 is described with reference to FIG. 1B. In this example, Server A (152) and Server B (154) are coupled to a LAN (156), and Server C (158) is coupled to a LAN (160). Each of the servers includes an STP facility 162, and each facility is coupled to one another via one or more STP links 164.

Further, LAN 156 is coupled to a console 170 and LAN 160 is coupled to a console 172. Console 170 is further coupled to an external time source (ETS) 174, such as a dial out to a telephone time service (e.g., ACTS: NIST Automated Computer Time Service). In this network, there is no ETR network. Server B has a stratum level of 1, and Servers A and C have a stratum level of 2.

The server that is to act as the active stratum-1 server in the network, such as an STP-only network, is specified as part of a stratum-1 configuration defined for the network. The stratum-1 configuration is maintained at each server of the network and provides information relating to the configuration of the network, including, for instance, the type of configuration defined for the network. The network can be configured as one of various types, including, for instance:

a) Null Configuration—In a null configuration, a stratum-1 server is not identified. The server remains unsynchronized until it attaches to a server that has a non-null stratum-1 configuration. The stratum-1 configuration at a server that is at stratum level 0 is equal to the null configuration when, for instance, it is not attached to any other server and the single CEC-CTN indicator in a stratum-1 configuration information block, described below, is zero.

b) Single Server Definition—In a single server definition, the stratum-1 configuration defines a single primary stratum-1 server that acts as the active stratum-1 server for the CTN. The loss of the primary stratum-1 server results in the loss of synchronized time in the CTN until a new stratum-1 configuration is specified from the console.

A single server stratum-1 configuration may also include an indication that the specified stratum-1 server is the only server (e.g., computing electronic complex (CEC) or (CPC)) in the CTN and that no other or additional servers will be part of the CTN. In this case, the CTN is referred to as a single CEC CTN. When a stratum-1 configuration indicates that it is a single CEC CTN, the configuration is a valid stratum-1 configuration for the initialized state of the server following a power on reset. When a single server stratum-1 configuration does not specify that it is a single CEC CTN, the configuration is not a valid stratum-1 configuration for the initialized state of the server following a power on reset and the stratum-1 configuration is set to the null configuration.

c) Dual Server Configuration—In a dual server configuration, the configuration includes a primary stratum-1 server and an alternate stratum-1 server. The use of a dual server configuration provides a mechanism for an alternate server to be able to take over the role of active stratum-1 server for the CTN. The alternate stratum-1 server, when configured with the same connectivity to other servers in the CTN as the primary stratum-1 server, can take over as the active stratum-1 without disruption to the synchronization capability of the CTN. The stratum-1 server (primary or alternate) that is acting as the active stratum-1 server for a CTN is indicated in the stratum-1 configuration information block maintained at each server in the CTN, as described below. The stratum-1 server that is not the active stratum-1 server is defined as the inactive stratum-1 server.

The inactive stratum-1 server in a dual server configuration takes over the role of the active stratum-1 server when it detects an active stratum-1 failure. An active stratum-1 failure is detected in a dual server configuration when one of the following occurs:

A console assisted recovery procedure is performed and indicates that an active stratum-1 failure has occurred, or A stratum-1 system check signal is recognized.

The inactive stratum-1 server in a dual server configuration performs the console assisted recovery when the inactive stratum-1 server loses attachment to the active stratum-1 server.

d) Triad Configuration—In a triad configuration, the stratum-1 configuration includes a primary stratum-1 server, an alternate stratum-1 server, and an arbiter server. The definition of a triad configuration provides a mechanism for an alternate server to be able to take over the role of active stratum-1 server for the CTN, as defined for a dual server configuration. Additionally, the definition of an arbiter server, when configured with connectivity to both the primary stratum-1 and alternate stratum-1 servers, provides a mechanism for the inactive stratum-1 and arbiter servers to communicate with each other to be able to determine that an active stratum-1 server failure has occurred and that the inactive stratum-1 should take over as the active stratum-1 server.

The inactive stratum-1 server in a triad configuration takes over the role of the active stratum-1 when it recognizes an active stratum-1 failure. The inactive stratum-1 server recognizes an active stratum-1 failure when any of the following occurs:

A triad recovery procedure is performed and indicates that an active stratum-1 failure has occurred.

A console assisted recovery procedure is performed and indicates that an active stratum-1 failure has occurred.

The inactive stratum-1 server performs the triad recovery procedure when the following conditions occur:

The inactive stratum-1 server loses attachment to the active stratum-1 server and has attachment to the arbiter.

The inactive stratum-1 server recognizes an active stratum-1 communication timeout and has attachment to the arbiter.

The inactive stratum-1 server performs the console assisted recovery when the inactive stratum-1 server loses attachment to the active stratum-1 server and is not attached to the arbiter.

The inactive stratum-1 server performs the active stratum-1 takeover procedure to take over the role of the active stratum-1 server for the CTN.

The active stratum-1 server in a triad configuration gives up the role of active stratum-1 server when it detects that it has lost attachment to both the inactive stratum-1 server and the arbiter server. The active stratum-1 server performs an active stratum-1 surrender procedure to give up the role of the active stratum-1 server for the CTN.

In one example, the stratum-1 configuration information is maintained in a control block, referred to as a stratum-1 configuration information block (SCIB), that is stored on or accessible to each server of the network. The SCIB is used to identify the stratum-1 configuration for a network.

Figure 2:
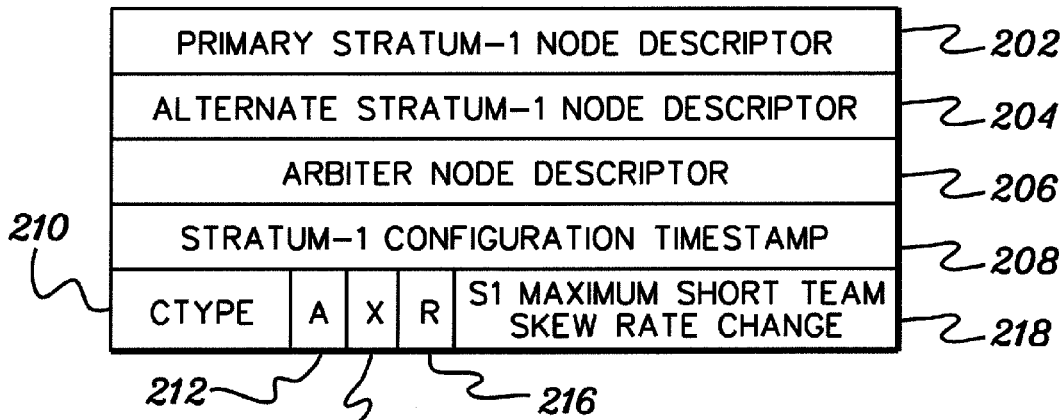
FIG. 2 depicts one example of a stratum-1 configuration information block, in accordance with an aspect of the present invention.

One embodiment of a stratum-1 configuration information block 200 is described with reference to FIG. 2. Stratum-1 configuration information block 200 includes, for instance, the following fields:

a) Primary Stratum-1 Node Descriptor 202: This field is valid when a single server, dual server or triad definition has been specified in the configuration type field of the configuration information block, described below, and when valid, includes the node descriptor of the primary stratum-1 node descriptor.

b) Alternate Stratum-1 Node Descriptor 204: This field is valid when a dual server or triad definition has been specified in the configuration type field, when valid, includes the node descriptor of the alternate stratum-1 server node descriptor.

c) Arbiter Node Descriptor 206: This field is valid when a triad definition has been specified in the configuration type field and includes the node descriptor of the arbiter server node descriptor.

d) Stratum-1 Configuration Timestamp 208: This field includes a timestamp indicating the time at which the stratum-1 configuration information in this block became current at the server.

e) Configuration Type (CType) 210: This field specifies the type of stratum-1 configuration, as defined below:
  Null definition—None of the node descriptors are valid.
  Single server definition—Only the primary stratum-1 node descriptor is valid.
  Dual server definition: The primary stratum-1 and alternate stratum-1 node descriptors are valid.
  Triad definition: The primary stratum-1, alternate stratum-1 and arbiter node descriptors are valid.

f) Active Stratum-1 (A) 212: This field is valid when a dual server or triad definition has been specified and indicates whether the primary stratum-1 server or the alternate stratum-1 server is the active stratum-1 server.

g) Single CEC CTN (X) 214: This field is valid when the configuration type specifies a single server definition and when one, as an example, indicates the CTN is a single CEC CTN. When the field is, for instance, zero, the CTN is not a single CEC CTN.

h) Recovery Configuration (R) 216: This field indicates whether the stratum-1 configuration described by this block is the result of a stratum-1 recovery action or a console command.

i) Stratum-1 Maximum Short Term Skew Rate Change 218: This field includes a value that specifies the maximum possible change in the skew rate of the physical oscillator at the stratum-1 server that may occur over any specified period (e.g., 60 seconds). This field is used to form a value that is in the same format as the base-steering rate. On machines that are not capable of performing dynamic oscillator switching, the value is equal to the maximum stratum-1 oscillator frequency drift that can occur over a specified period of (e.g., 60 seconds). On machines that are capable of performing dynamic oscillator switching, the value is set to the maximum range of skew tolerance specified for the oscillator. For example, on a machine that supports dynamic oscillator switching with oscillator skew tolerance specified at +/−2 ppm to nominal frequency, the value is set to the equivalent of 4 ppm. A dynamic oscillator switch occurs when the physical oscillator used to drive the system TOD clock is switched from one oscillator to another.

In addition to the above control block, another control block, referred to as the new stratum-1 configuration information block (NSCIB), may be used to specify a new stratum-1 configuration for the CTN. Additionally, it may be used to specify an update to the CTN ID that is to occur concurrently with the stratum-1 configuration change.

In one example, the NSCIB at a server is meaningful when the server is configured to be part of an STP-only CTN configuration or if the STP-migration bit in the NSCIB is equal to one.

Figure 3:
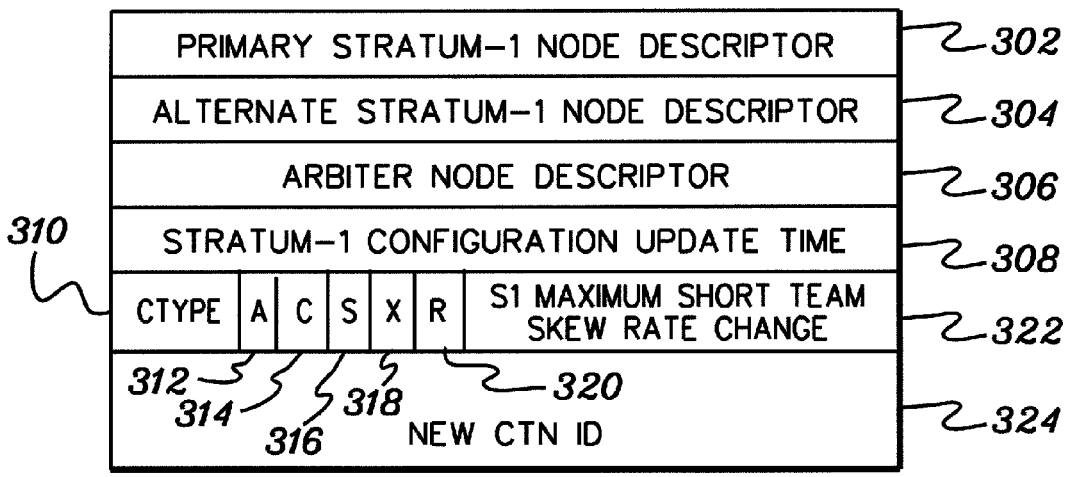
FIG. 3 depicts one example of a new stratum-1 configuration information block, in accordance with an aspect of the present invention.

One embodiment of a new stratum-1 configuration information block 300 is described with reference to FIG. 3. New stratum-1 configuration information block 300 includes, for instance, the following fields:

a) Primary Stratum-1 Node Descriptor 302: This field is valid when a single-server, dual server or triad definition has been specified in the configuration-type field and includes the node descriptor of the new primary stratum-1 node descriptor.

b) Alternate Stratum-1 Node Descriptor 304: This field is valid when a dual server or triad definition has been specified in the configuration-type field and includes the node descriptor of the new alternate stratum-1 node descriptor.

c) Arbiter Node Descriptor 306: This field is valid when a triad definition has been specified in the configuration type field and includes the node descriptor of the new arbiter node descriptor.

d) Stratum-1 Configuration Update Time 308: When the server is configured to be part of an STP-only CTN, this field includes a timestamp that indicates when the values in this block are to become current for CTN. When the server is not configured to be part of an STP-only CTN, the field is meaningless.

e) Configuration Type (CType) 310: This field specifies the type of stratum-1 configuration as defined below:
  Null definition—None of the node descriptors are valid.
  Single server definition—Only the primary stratum-1 node descriptor is valid.
  Dual server definition: The primary stratum-1 and alternate stratum-1 node descriptors are valid.
  Triad definition: The primary stratum-1, alternate stratum-1 and arbiter node descriptors are valid.

f) Active Stratum-1 (A) 312: This field is valid when a dual server or triad definition has been specified and indicates whether the primary stratum-1 server or the alternate stratum-1 server is the active stratum-1 server.

g) CTN ID Change (C) 314: When the server is configured to be part of an STP-only CTN, this field indicates whether a CTN ID change is being requested and the CTN ID is valid. The change occurs at the stratum-1 configuration update time.
  The CTN ID is a value that is used to identify a CTN. The CTN ID includes, for instance, an STP network ID and an ETR network number. The STP network ID identifies the STP network, if any, that is configured for the server. The ETR network number identifies the ETR network number, if any, that is configured for this server.

h) STP Migration Configuration (S) 316: This field is meaningful when, for instance, the server is not configured as an STP-only CTN. The field indicates whether an STP-only migration stratum-1 configuration has been defined for the server. When the field is, for instance, one, the NSCIB includes the stratum-1 configuration that is to become current when the CTN ID at the server is modified to an STP-only configuration. When the field is zero, an STP-only migration stratum-1 configuration is not defined for the server.

i) Single CEC CTN (X) 318: This field is valid when the configuration type specifies a single server definition and when one, as an example, indicates the CTN is a single CEC CTN. When the field is, for instance, zero, the CTN is not a single CEC CTN.

j) Recovery Configuration (R) 320: This field indicates whether the stratum-1 configuration described by this block is the result of a stratum-1 recovery action or a console command.

k) Stratum-1 Maximum Short Term Skew Rate Change 322: This field includes a value that specifies the maximum possible change in the skew rate of the physical oscillator at the new stratum-1 server that may occur over any specified period (e.g., 60 seconds).

l) New CTN ID 320: This field is valid when the CTN-ID change indicator specifies a CTN ID change request and a valid CTN ID. This field specifies the new CTN ID.

If the new stratum-1 configuration information block is not to be used to specify an update to the CTN ID, then the block may not include the CTN ID change bit or the new CTN ID, as an example. Further details on coordinated timing networks and on defining a stratum-1 configuration for a timing network are described in the following co-filed applications: S. Carlson et al., "Facilitating Synchronization of Servers in a Coordinated Timing Network", Ser. No. 60/887,584, filed Jan. 31, 2007; and S. Carlson, "Defining a Stratum-1 Configuration in a Coordinated Timing Network", Ser. No. 60/887,562, filed Jan. 31, 2007, both of which are hereby incorporated herein by reference in their entirety.

As noted initially, in one aspect, provided herein are exchange time parameters (XTP) command and response messages, as well as server time protocol control (STC) messages for a server time protocol facility, such as described above. Again, server time protocol (STP) messages are transmitted over STP paths between two servers in the form of a message command and a message response. A message command is sent from a server to an attached server; and an STP message response is sent from a server to an attached server in response to a message command received from the attached server. The message response is sent to the attached server on the link from which the message command was received. As used herein, a server sending a message command is referred to as the message originator, while a server receiving a message command is referred to as the message recipient. A message command contains a message command code that indicates the type of message being transmitted. For example, the STP message command codes may support:

Exchange Time Parameters (XTP) Messages
STP Control (STC) Messages

The message response contains a response code that describes the result of the attempt to execute the message command. General responses are defined below. Not all responses apply to all message commands. Additional command-dependent responses may be defined for individual commands. When multiple response conditions can be detected concurrently, the lowest numbered response code may be reported.

Command Codes:
Successful: The message command was successfully performed.
STP Not Enabled: The STP facility is installed, but not enabled at the attached server.
Busy: The message command cannot be performed at this time due to busy conditions or resource contention.
Invalid Operation Parameters: The message command contains invalid parameters.
Configuration Error: The message command contains a mismatched CTN ID.
Path Not Established: The path is not established at the attached server.
CF Response: Indicates that the STP facility is not supported at the attached server.

The exchange time parameters (XTP) message is used to exchange timestamps, time keeping information and CTN-parameter information between two directly attached servers. The information in the message response is used by the message originator to calculate the round-trip delay, offset, and dispersion values that are used by STP clock filtering and selection algorithms to select a clock source. It is also used to set CTN time keeping parameters and ensure synchronization of the attached servers.

The STP facility at the server maintains a history of the timestamp and time keeping information received in XTP message responses in an XTP-trace array. The number of samples maintained in the array can vary. XTP-transmit procedures are used to transmit XTP message commands, and XTP-receive procedures are used to receive XTP messages, as described further below.

XTP Message Command

Figure 4:
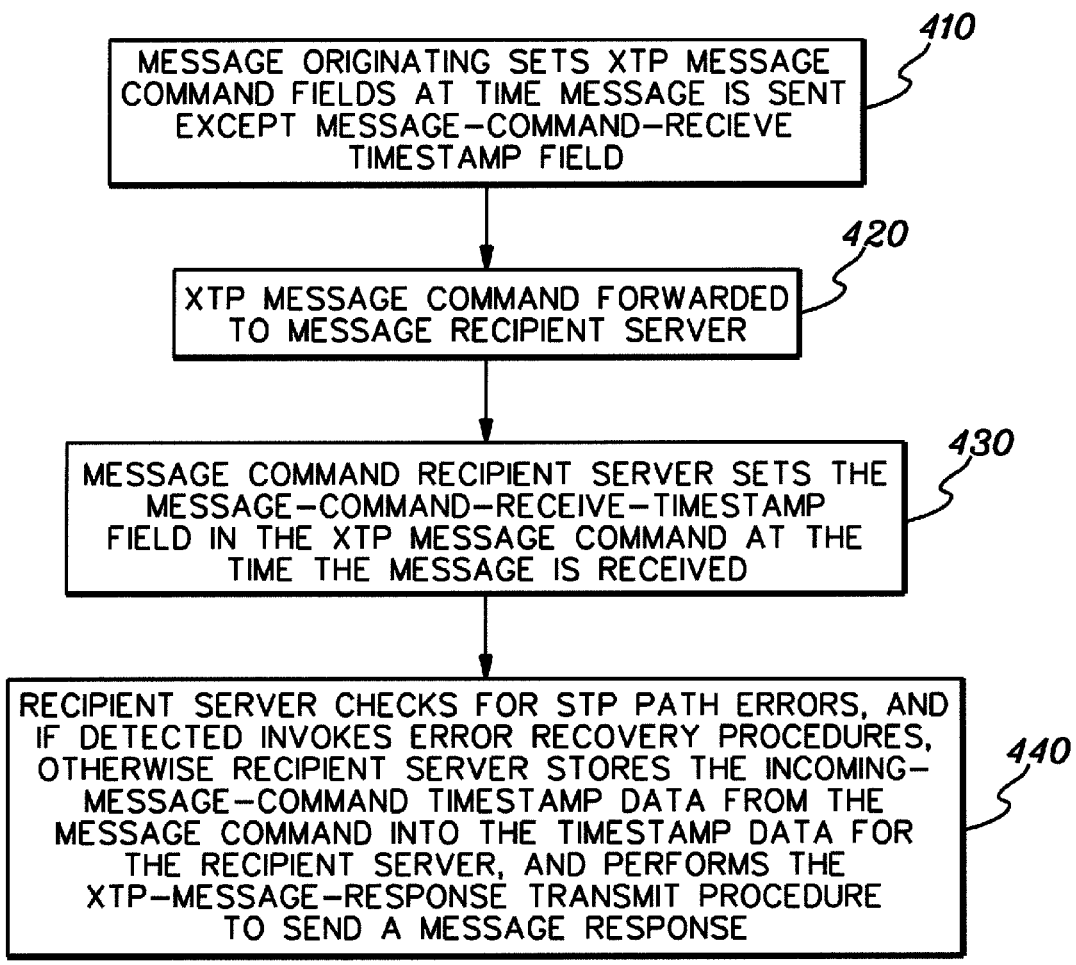
FIG. 4 is a flowchart of one embodiment of XTP message command processing, in accordance with an aspect of the present invention.
Figure 5:
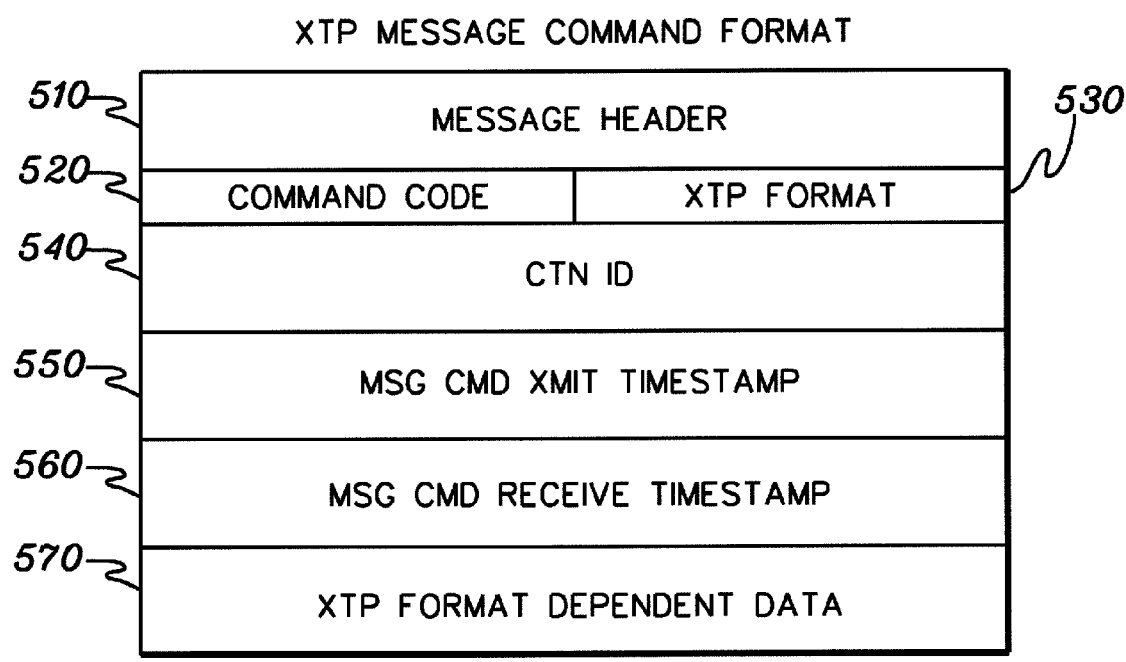
FIG. 5 depicts one embodiment of an XTP message command format, in accordance with an aspect of the present invention.

As shown by the example of FIG. 4, the STP facility at the server sending an XTP message command sets all relevant fields in the message command, except for the message-command-receive timestamp field 410. The XTP message command fields are set by the message originating server at the time the message is sent. One XTP message command format is depicted in FIG. 5. In this format, message header 510 contains information that is dependent on the type of data link that is used to implement the STP link. Command code 520 contains an indication of the particular XTP message command. XTP format 530 contains a value that specifies the format of the format-dependent-area in the message command. This value might be set to zero for message commands. CTN ID 540 is set to the CTN ID of the server sending the message command, i.e., the originating server. Message command transmit timestamp 550 is set to the time of day (TOD) clock at the originating server at the time the message is transmitted over the STP path by the server. Message command receive timestamp 560 is set by the receiving server, as explained below. XTP format dependent data 570 is set to zero for an XTP message command.

Continuing with FIG. 4, the XTP message command is forwarded to an attached server, that is, the message recipient server 420. The command message recipient server sets the message-command-receive-timestamp field in the XTP message command at the time the message is received at that server 430. The message command receive timestamp field is set from the time of day (TOD) clock at the recipient server when the message command is received. Again, at the time the XTP message command was transmitted from the originating server, the message command receive timestamp field was undefined.

The message recipient checks for STP path error, and if detected, invokes error-recovery procedures. Otherwise, the recipient server stores the incoming-message-command-timestamp data from the message command into the timestamp data for the recipient server, and performs an XTP-message-response transmit procedure to generate and send a message response 440 (FIG. 4).

XTP Message Response

Figure 6:
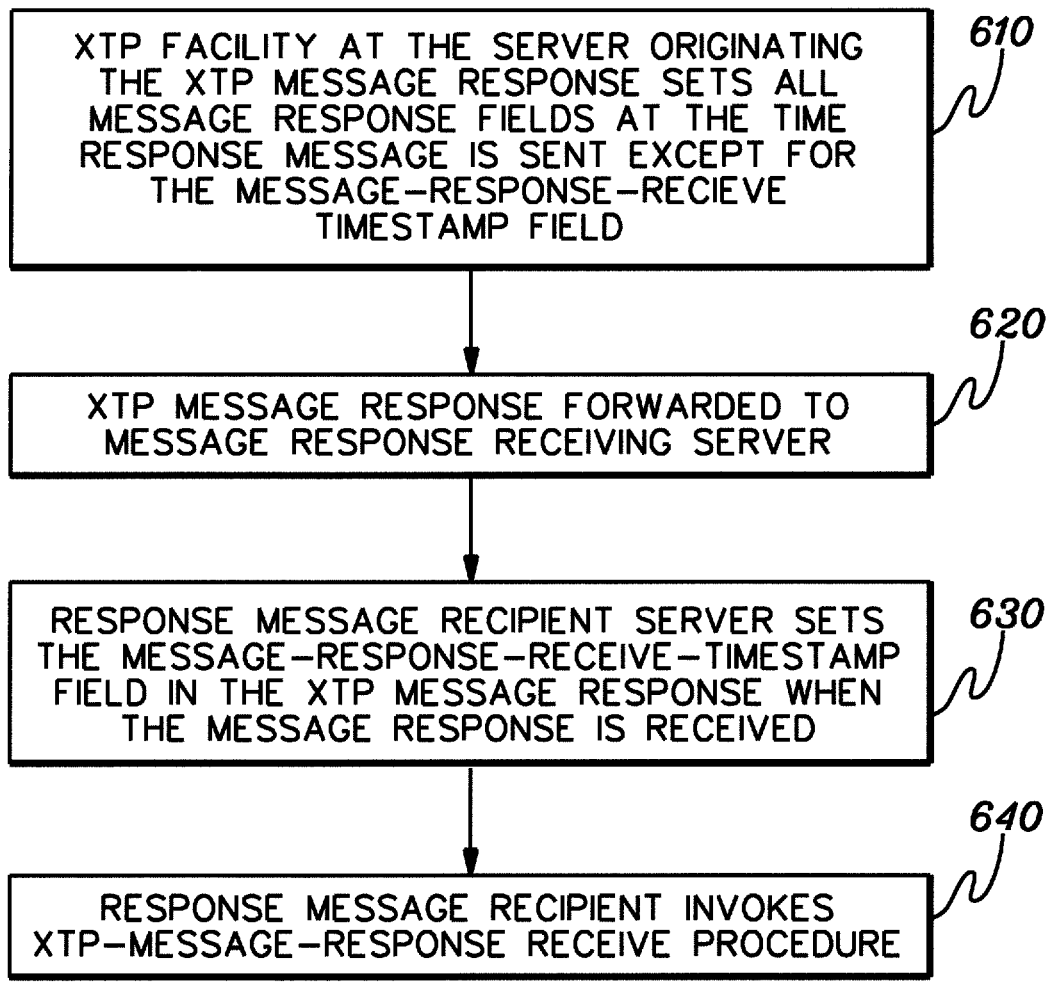
FIG. 6 is a flowchart of one embodiment of XTP message response processing, in accordance with an aspect of the present invention.

FIG. 6 depicts one embodiment of protocol for generating and handling an XTP message response. The STP facility receiving the XTP message command, that is, the server originating the XTP response message, sets all message response fields at the time the response message is to be sent, except for the message-response-receive timestamp field 610.

Figure 7:
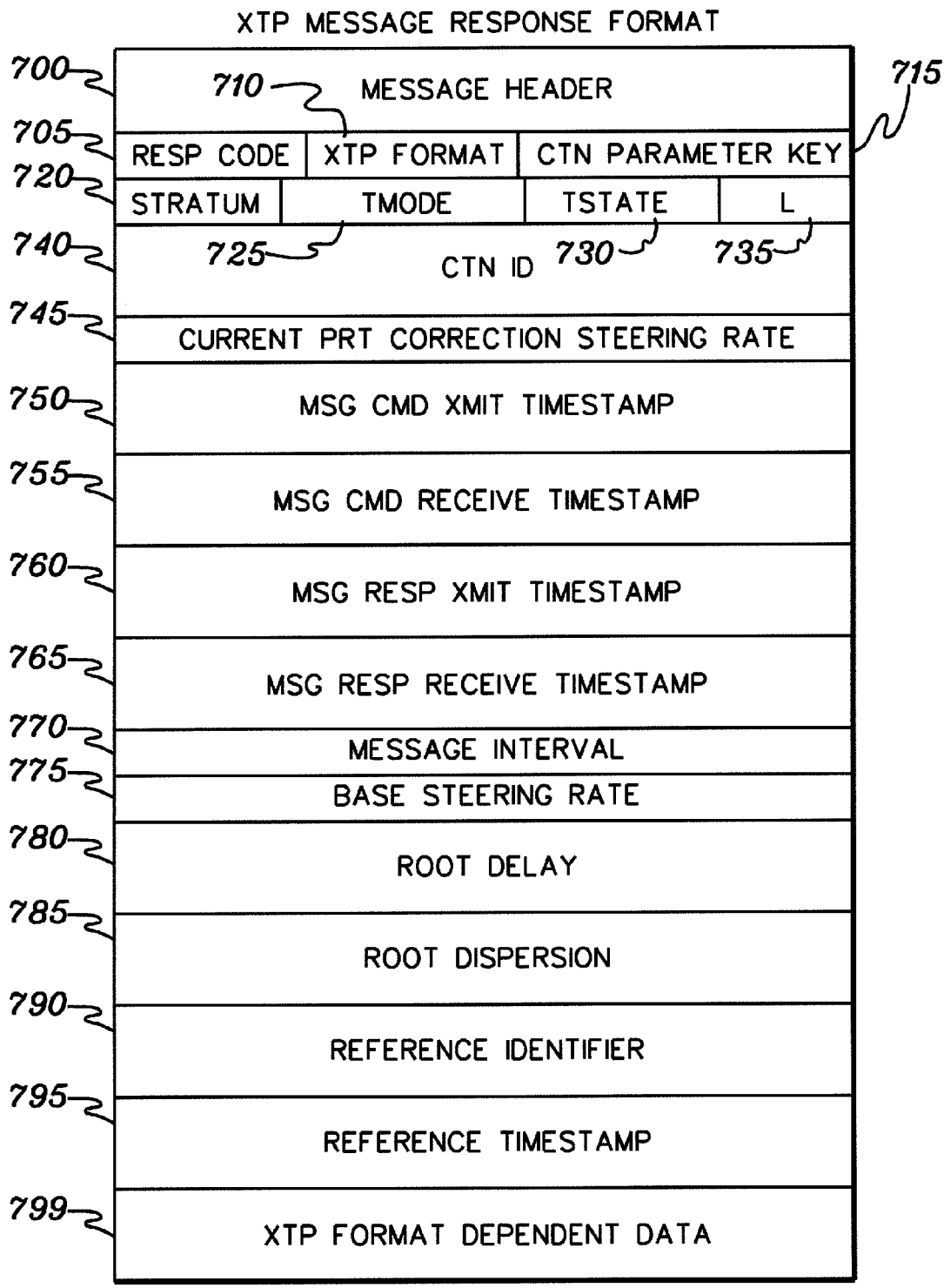
FIG. 7 depicts one embodiment of an XTP message response format, in accordance with an aspect of the present invention.

FIG. 7 depicts one embodiment of an XTP message response format. In this format, the fields are defined as follows:

Message Header 700: Contains information that is dependent on the type of data link that is used to implement the STP link employed.
Response Code 705: Is an integer that describes the results of the attempt to execute the message. Valid response codes may include:
1. Successful: The message command was successfully performed.
2. STP Not Enabled: The STP facility is installed, but not enabled at the attached server.

3. Configuration Error: The message command contains a mismatched CTN ID.
4. Path Not Established: The path is not established at the attached server.
5. CF Response: An indication that the STP facility is not supported at the attached server.

XTP Format 710: Specifies the format of the format-dependent-area in the message response, which by way of example, may comprise valid values of 0, 1 and 2, as explained further below.

CTN Parameter Key 715: Indicates whether the contents of the format-dependent-area have changed. The field is only valid (i.e., incremented or changed) in STP-only CTNs. In a mixed-CTN, the field is meaningless and ignored. The active-stratum-1 server increments the CTN parameter key whenever it changes the format used in the XTP message response or when it changes any value in the data sent in the format-dependent-data-area. A secondary-time server sets the CTN Parameter Key 715 to the value it received in the last XTP-message response from its current clock source, or, if it does not have a clock source, to the same value it sent in its last XTP-message response. The initialized value is zero, and the field wraps to zero.

Stratum 720: Is set to the stratum level of the server sending the message response.

Timing Mode 725: Is set to the timing-mode code of the server sending the message response.

Timing State 730: Is set to the timing-state code of the server sending the message response.

Local Clock Server (L) 735: Specifies whether the server sending the message response is configured as a local-clock source.

CTN ID 740: Is set to the CTN ID of the server sending the message response.

Current Primary Reference Time (PRT) Correction Steering Rate 745:
  Contains the current-PRT-correction-steering rate for the CTN. In XTP message responses sent by the stratum-1 server, it contains the PRT correction steering rate that was in effect at the time the message was sent. In XTP message responses sent by secondary servers, the field is set to the value received in the most recent XTP message response received from the clock source for the server. The PRT-correction steering rate (PCSR) is used to correct an accumulated error between the current TOD clock at the active-stratum-1 server and the primary-reference time. In a mixed CTN, the PCSR is set to zero.

Message Command Transmit Timestamp 750: Is set to the incoming message-command-transmit timestamp.

Message Command Received Timestamp 755: Is set to the incoming message-command-receive timestamp.

Message Response Transmit Timestamp 760: Is set to the TOD clock of the server sending the message response at the time the message is transmitted.

Message Response Receive Timestamp 765: Contains the timestamp of the time at which the message response is received by the attached server. The field is set from the TOD clock at the server receiving the message response when the message response is received.

Message Interval 770: Is set to the outgoing-message-interval field from the attached-server time keeping parameters set at the sending server.

Base Steering Rate 775: Is set to the base-steering rate of the server sending the message response.

Root Delay 780: Is set to the Coordinated Server Time (CST)-round-trip delay at the server sending the message response.

Root Dispersion 785: Is set to the CST-clock dispersion at the server sending the message response.

Reference Identifier 790: Is set to the CST-reference ID at the server sending the message response.

Reference Timestamp 795: Is set to the CST-reference timestamp at the server sending the message response. The timestamp is in STP-timestamp format.

Figure 9:
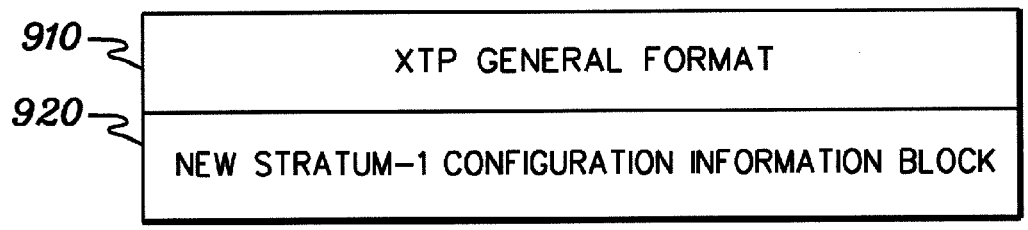
FIG. 9 depicts another embodiment of an XTP message response data format, in accordance with an aspect of the present invention.
Figure 10:
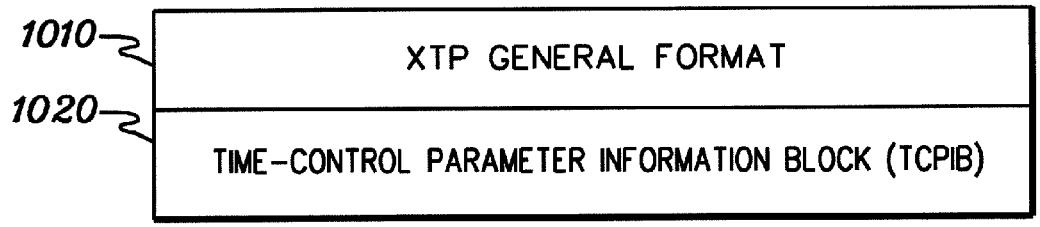
FIG. 10 depicts still another embodiment of an XTP message response data format, in accordance with an aspect of the present invention.

XTP Format Dependent Data 799: Is set based on the format field. Three message response format fields are depicted in FIGS. 8, 9 & 10.

Figure 8:
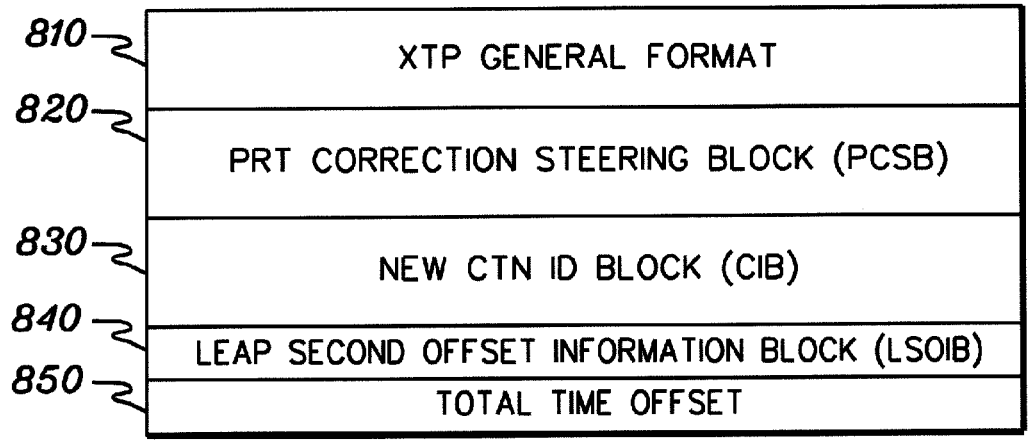
FIG. 8 depicts one embodiment of an XTP message response data format, in accordance with an aspect of the present invention.

FIG. 8 depicts a message response format-0 data (which is used to deliver general CTN parameter information) and includes the XTP general format 810, the primary reference time (PRT) correction steering block (PCSB) 820, a new CTN ID block (CIB) 830, a leap second offset information block (LSOIB) 840, and a total time offset 850. The message response format-1 data of FIG. 9 is used to deliver a new stratum-1-configuration-information block, and if specified, a new CTN ID, and includes an XTP general format 910 and a new stratum-1 configuration information block 920. The message response format-2 data of FIG. 10, which includes an XTP general format 1010 and a time-control parameter information block (TCPIB) 1020, is used to deliver a time control parameter such as a timezone control parameter information block.

Returning to FIG. 6, the XTP message response is forwarded to a message response receiving server 620, which as noted, is the attached server originating the XTP message command. The attached server sets the message-response-receive-timestamp field in the XTP message response when the message response is received 630, and invokes an XTP-message-response-received procedure 640 (described below). As noted above, XTP-transmit procedures are used to transmit an XTP-message command 420 (FIG. 4) or an XTP-message response 620 (FIG. 6), as explained further below.

The format used for an XTP-message response by a primary-time server is dependent on whether a CTN-parameter update is in progress. If an update is in progress, then the primary-time server uses the format that contains the parameter being updated. When a CTN-parameter update is not in progress, the format-0 XTP-message response may be used for all responses. The format used for an XTP-message response by a secondary-time server is dependent on whether the server has a clock source. When the server has a clock source, it uses the same format as that provided in the last valid response from the clock source. When the server does not have a clock source, it uses the format-0 response.

Message Command Transmit

The XTP-message-command-transmit procedure is used to transmit the exchange time parameters (XTP) message command to a specified, attached server. The STP path that is used to transmit the message is determined using, for example, a model-dependent STP-path-selection procedure.

Initiative to issue an XTP-message command is established when the message-interval timer for an attached server expires. The message-interval parameter for the attached server specifies the rate at which XTP-message commands are sent to the attached server.

The XTP-message-command-transmit procedure builds the message header, sets the message command code equal to the XTP-command code and builds the remainder of the XTP-message command. Immediately prior to sending the message, the message-command-transmit timestamp in the message command is set equal to the current TOD clock and the command is transmitted over the selected STP path. If an STP-message-undeliverable condition is detected, an invalid entry is added to the XTP-trace array.

Message Response Transmit

The message-response transmit procedure is used to transmit an XTP message response following receipt of an XTP-message command. The procedure builds the message-response header, sets the message-response code and builds the remainder of the XTP-message response. Immediately prior to sending the message, the message-response-transmit timestamp in the message response is set equal to the current time of day value and the response is transmitted on the STP path over which the message command was received.

XTP Receive Procedures

XTP-receive procedures are used to receive an XTP-message command or an XTP-message response.

Message Response Received

Figure 11A:
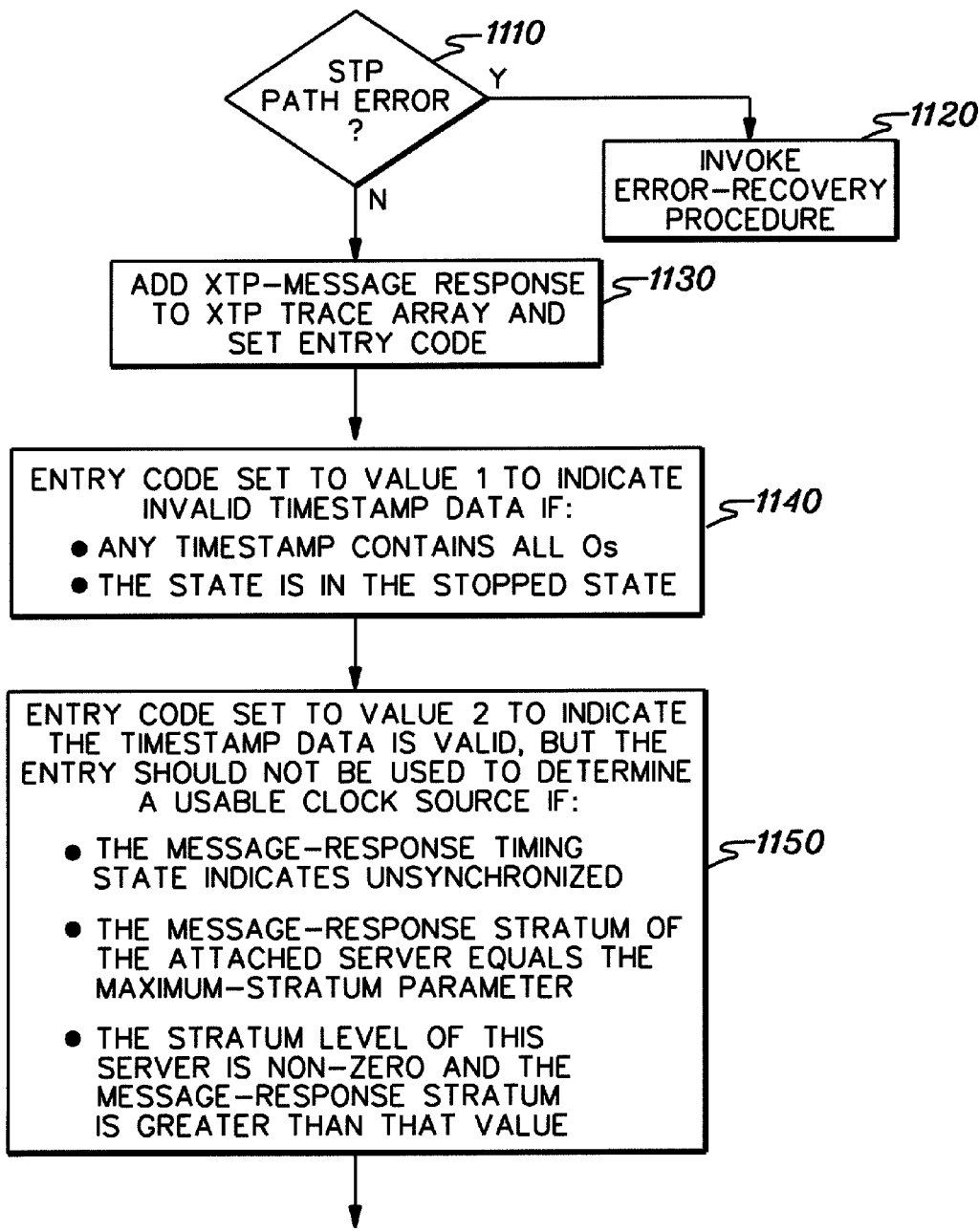
FIGS. 11A & 11B depict one XTP message command transmit process, in accordance with an aspect of the present invention.
Figure 11B:
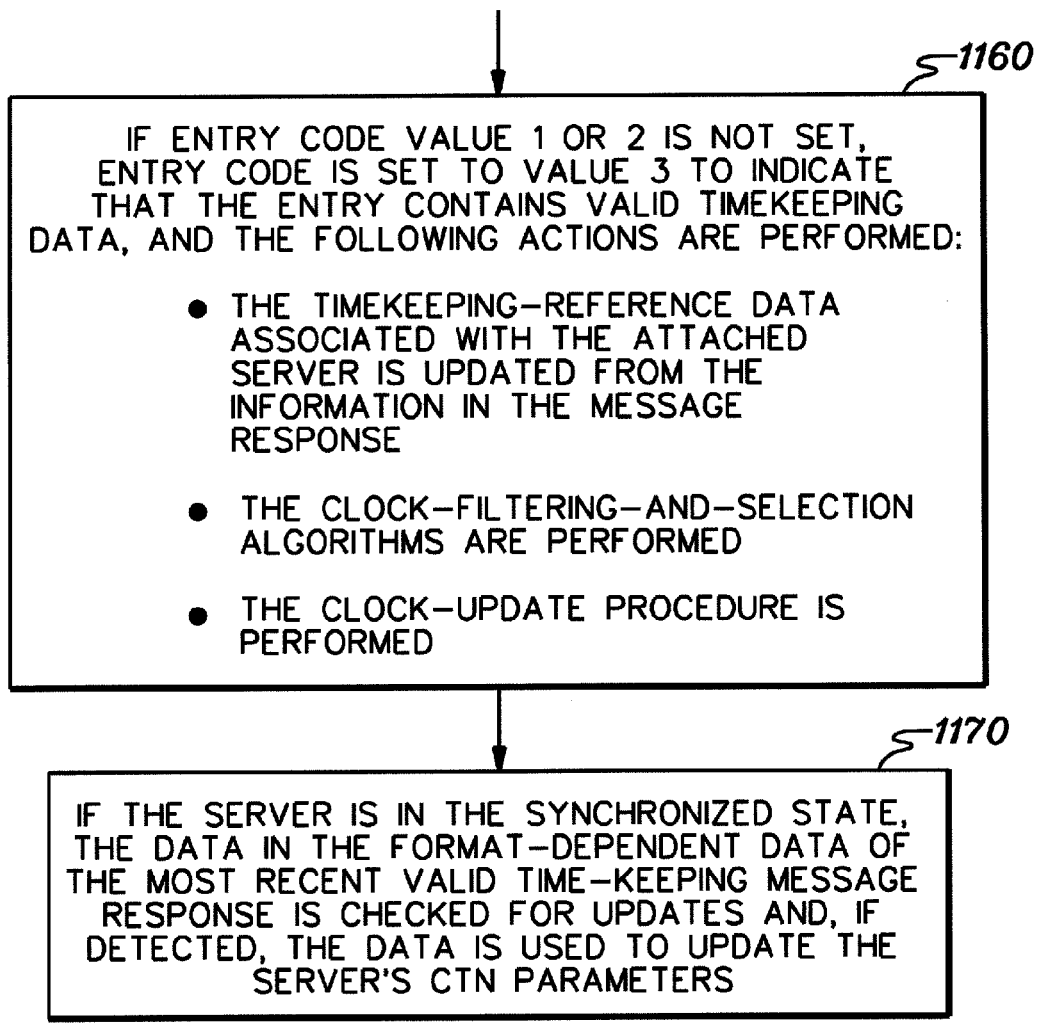

FIGS. 11A & 11B depict one embodiment of logic implemented for XTP-message-response-receive processing. The XTP-message-response-receive procedure is invoked each time an XTP-message response is received on an STP path.

The procedure initially checks for an STP-path error 1110, and if an error is detected, an error-recovery procedure 1120 is invoked. If no STP-path error is detected, then the STP-message response is added to the XTP trace array and the entry code is set 1130.

The entry code is set to a first value 1140 to indicate the timestamp data is invalid if any of the following conditions are true:
  Any timestamp contains all zeros, or
  The timing state is in the stopped state.

If the entry code is not set to the first value, then the entry code is set to a second value 1150 to indicate that the timestamp data is valid, but the entry should not be used to determine a usable clock source if any of the following conditions are true:
  The message-response timing state indicates unsynchronized,
  The message-response stratum of the attached server equals the maximum-stratum parameter, or
  The stratum level of the server is non-zero and the message-response stratum is greater than that value.

If the entry code is not set to the first value or second value, then the entry code is set to a third value 1160 (FIG. 11B), indicating that the entry contains valid time keeping data, and the following actions are performed:
  The time-keeping-reference data associated with the attached server is updated from the information in the message response.
  Clock-filtering-and-selection processes are performed.
  A clock-update procedure is performed.
  If the server is in the synchronized state, then the data in the format-dependent data field of the most recent valid time-keeping message response is checked for updates and, if detected, the data is used to update the server's CTN parameters 1170.

Message Command Received

Figure 12:
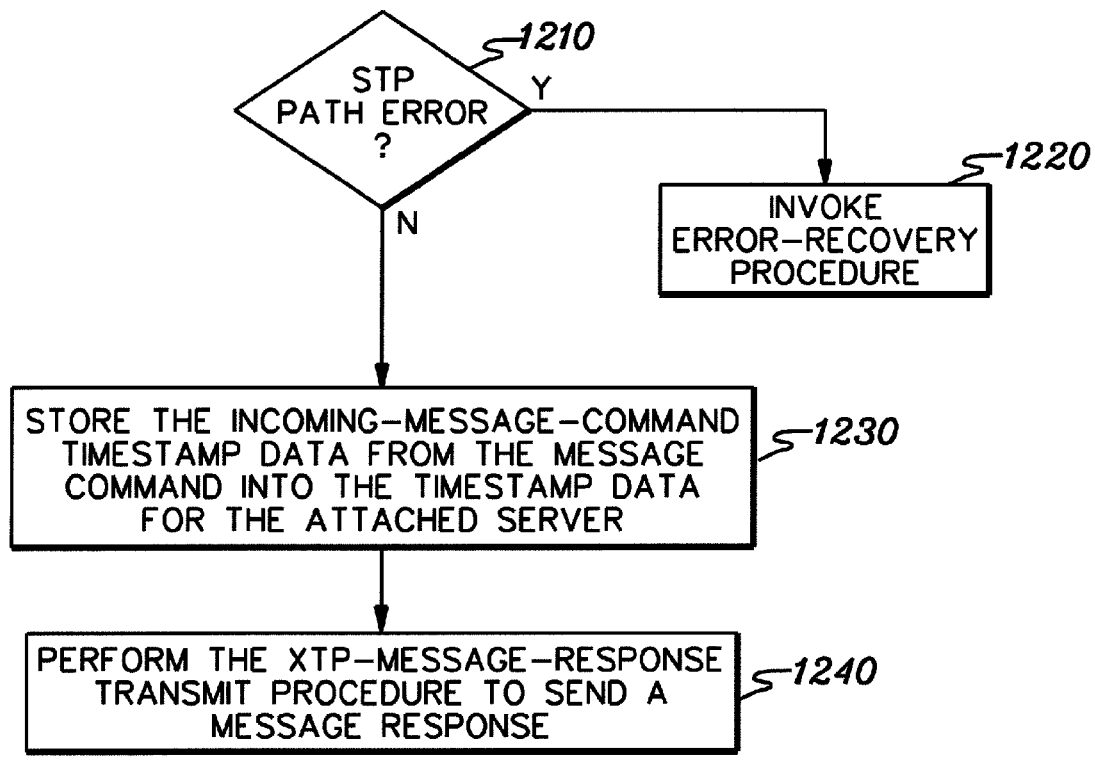
FIG. 12 is a flowchart of one embodiment of processing associated with an XTP response message transmit procedure, in accordance with an aspect of the present invention.

The XTP-message-command-receive procedure is invoked each time an XTP-message command is received on an STP path. FIG. 12 depicts one embodiment of such a procedure. As shown, the procedure includes checking for an STP path error 1210, and if an error is detected, initiating error-recovery procedure 1220. If no STP path error is detected, then the procedure stores the incoming-message-command timestamp data from the message command into the timestamp data for the attached server 1230. The XTP-message-response transmit procedure is then performed to send a message response 1240.

STC Control Messages

An STP control (STC) message command is used to request CTN-parameter updates, to establish and remove STP paths, and to read configuration information from attached servers. The operation-code field in the message command specifies the operation to be performed.

Figure 13:
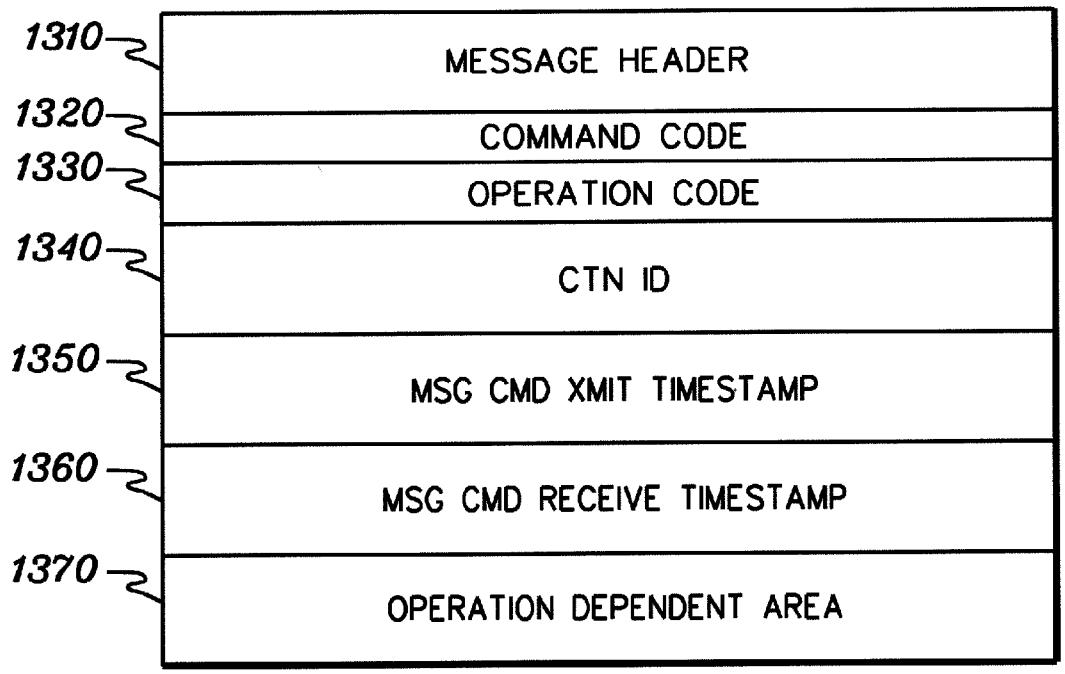
FIG. 13 depicts one embodiment of an STP control (STC) message command format, in accordance with an aspect of the present invention.

FIG. 13 depicts one embodiment of an STC message command format. The fields of this command format can be defined as follows:
  Message Header 1310: The message header field contains information that is dependent on the type of data link used to implement the STP link.
  Command Code 1320: The command code field is set to a value defined for STC message commands.
  Operation Code 1330: The operation code field contains a value that specifies the operation to be performed. Possible operations include:
    Update Request Operations
      Request-Stratum-1 Configuration Change
    Read Operations
      Read Node Attachment State
      Read CTN Parameters
    Notification Operations
      Establish STP Path
      Remove STP Path
      Set Arbiter Takeover Mode
      Reset Arbiter Takeover Mode
      Arbiter Takeover State Active
  CTN ID 1340: Contains the CTN ID of the sending server.
  Message Command Transmit Timestamp 1350: Is set from the time of day (TOD) clock at the server at the time the message is transmitted over the STP path by the server.
  Message Command Receive Timestamp 1360: Is set to the time at which the message command is received at the attached server. The field is set from the time of date clock at the attached server when the message command is received. At the time the message command is transmitted, the field is undefined.
  Operation Dependent Data 1370: This field contains data that is dependent on the operation code specified in the message command.

STC Message Response

Figure 14:
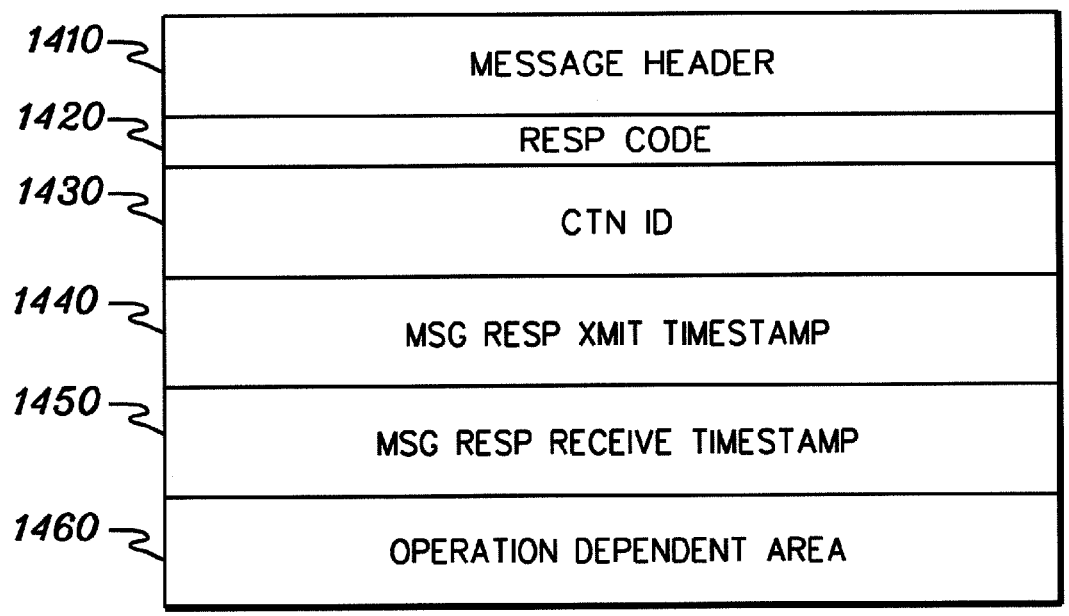
FIG. 14 depicts one embodiment of an STC message response format, in accordance with an aspect of the present invention.

FIG. 14 depicts one embodiment of an STC-message response format, wherein the fields of the format are defined as follows:
  Message Header 1410: Contains the message header field. The message header field contains information that is dependent on the type of data link that is used to implement the STP links.
  Response Code 1420: Contains the response code, which is an integer that describes the results of the attempt to execute the message command.
  CTN ID 1430: Contains the CTN ID of the sending server.
  Message Response Transmit Timestamp 1440: Is set from the time of day clock of the server sending the message response at the time the message response is transmitted.
  Message Response Receive Timestamp 1450: Contains the timestamp of the time at which the message response was received by the attached server. The field is set from the time of day clock at the server receiving the message response when the message response is received.
  Operation Dependent Data 1460: This field contains data that is dependent on the operation code specified in the message command.

As noted above, STC operations are specified by the operation code transmitted in each STC control message. The following types of operations are supported as described below: Update Request Operations; Read Operations; and Notification Operations.

Update Request Operations

An update request STP control message is sent by a secondary STP server to notify the active-stratum-1 server of a CTN-parameter update request. If the secondary-time server is directly attached to an active-stratum-1 server, then the secondary-time server sends the message to the active-stratum-1 server. If the secondary-time server is not directly attached to an active-stratum-1 server, then the secondary-time server sends the message to all attached servers that have a lower stratum level.

A secondary-time server has initiative to send an update-request message upon receipt of a console command request to update a CTN parameter or upon receipt of an update-request operation from another secondary-time server. When a secondary-time server receives an update-request message, it sends the update-request parameter in the message to all attached servers with a lower stratum level using a new update-request message.

Upon receiving an update-request operation, the active-stratum-1 server performs the CTN-parameter update procedure.

Request Stratum-1 Configuration Change

The request-stratum-1 configuration change operation is issued by a secondary-time server to request a change to the stratum-1 configuration for the CTN. The operation is issued by a secondary-time server after it has accepted a console command to modify the stratum-1 configuration for the CTN. A secondary-time server accepts the modify-stratum-1 configuration command only when the new stratum-1 configuration specifies the secondary-time server as the new active-stratum-1 server. The operation-dependent area of the message command is illustrated in FIG. 15.

Stratum-1 Configuration Block 1500: Contains the new stratum-1 configuration that is being requested. The valid responses for the operation are as follows:
Successful: The message command was successfully performed.
STP Not Enabled: The STP facility is installed, but not enabled at the attached server.
Busy: The message command cannot be performed at this time due to busy conditions or resource contention.
Invalid Operation Parameters: The message command contains invalid parameters.
Configuration Error: The message command contains a mismatched CTN ID.
Path Not Established: The path is not established at the attached server.
CF Response: The response codes indicate that the STP facility is not supported at the attached server.

The operation-dependent area of the message response does not contain meaningful data.

Read Operations

Read commands are used to obtain CTN parameters and configuration information from attached servers. The data that may be obtained from an attached server includes: Node Attachment State; and CTN Parameters.

Read Node Attachment State

The read-node-attachment state command returns the attachment state for the node descriptor provided in the operation-dependent area. Valid responses for this operation may again include:

Successful: The message command was successfully performed.
STP Not Enabled: The STP facility is installed, but not enabled at the attached server.
Busy: The message command cannot be performed at this time due to busy conditions or resource contention.
Invalid Operation Parameters: The message command contains invalid parameters.
Configuration Error: The message command contains a mismatched CTN ID.
Path Not Established: The path is not established at the attached server.
CF Response: An indication that the STP facility is not supported at the attached server.

When the response code is a particular value, the operation-dependent area of the message response may contain an attachment state bit.

Attachment State (A): Specifies the attachment state for the server described by the node descriptor provided in the message command. A first value indicates that the specified server is not attached to the message command receiver; and a second value indicates that the specified server is attached to the message command receiver.

Read CTN Parameters

The read-CTN-parameters operation reads CTN parameters from the attached server. The CTN parameters that are to be returned are specified in the message command operation-dependent area. The message command operation-dependent area may include:

CTN Parameter Code: Specifies the CTN parameters to be returned in the message response, for example:
Read General CTN Parameters
Read New Stratum-1 Configuration Information
Read Timezone-Control-Parameters Information Block (TCPIB)
Read Current Stratum-1 Confirmation Information Valid response codes for the operations may be as follows:
Successful: The message command was successfully performed.
STP Not Enabled: The STP facility is installed, but not enabled at the attached server.
Busy: The message command cannot be performed at this time due to busy conditions or resource contention.
Invalid Operation Parameters: The message command contains invalid parameters.
Configuration Error: The message commands contains a mismatched CTN ID.
Path Not Established: The path is not established at the attached server.
CF Response: An indication that the STP facility is not supported at the attached server.

When a particular response code is returned, the operation-dependent area of the message response block has (in one embodiment) the format illustrated in FIG. 16A.

CTN Parameter Code 1610: Specifies the CTN parameters that are provided in the message response, including:
General CTN parameters provided in the message response.
New Stratum-1 configuration information block provided in the message response.
TCPIB provided in the message response.
Current Stratum-1 configuration information block provided in the message response.
CTN Parameter Key 1620: Contains the CTN-parameter key for the server.

CTN Parameter Data Area 1630: The content of CTN-parameter data area depends on the CTN parameter code in the message response, as shown in FIG. 16B.

PRT (Primary Reference Time) Correction Steering Information Block (PCSIB) 1650: Contains the PCSIB for the server.

New CTN ID Information Block (NCIIB) 1660: Contains the new CIIB for the server.

Leap Second Offset Information Block (LSOIB) 1670: Contains the LSOIB for the server, and is used, for example, in converting between coordinated universal time (UTC) and STP time. Specifically, the new Leap Second Offset (LSO) update time is converted to UTC time stamp format, that is, the number of LSO seconds currently in effect at STP facility is converted.

New Stratum-1 Configuration Information Data Area:

New Stratum-1 Configuration Block: Contains the new-stratum-1 configuration block for the server.

TCPIB Data Area:

Timezone-Control Parameter Information Block (TCPIB): Contains the TCPIB for the server.

Current Stratum-1 Configuration Information Data Area:

Stratum-1 Configuration Block: Contains the current stratum-1 configuration information block for the server.

Notification Operations

Notification operations are used to establish or remove an STP path and for communication between the alternate-stratum-1 server and the arbiter during a stratum-1 takeover.

Establish STP Path

Figure 17A:
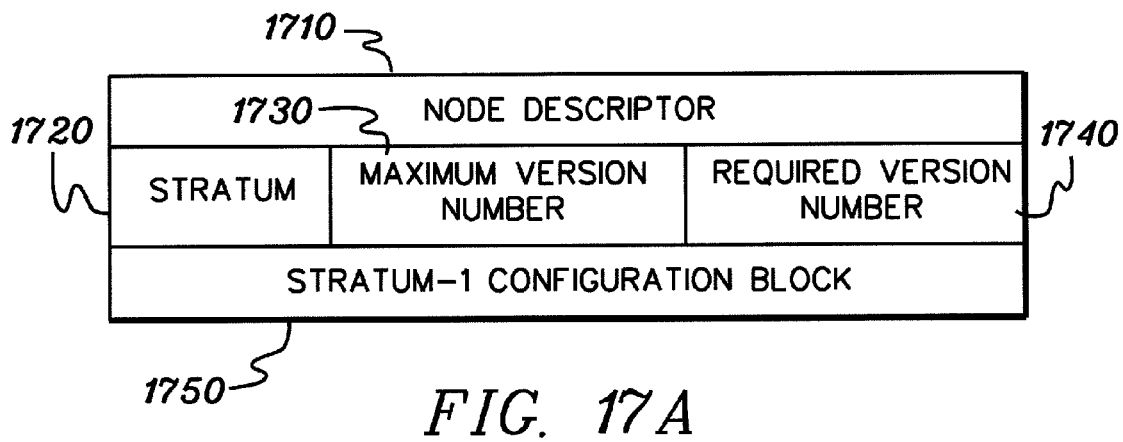
FIG. 17A depicts one embodiment of an establish STP path command in an operation-dependent area format, in accordance with an aspect of the present invention.

The establish-STP-path (ESP) operation is performed as part of the STP-path initialization procedure to establish a path between two servers. The operation is used to exchange and validate certain parameters associated with each of the attached servers. The message command operation-dependent area has, for example, the format illustrated in FIG. 17A.

Node Descriptor 1710: Contains the CPC node descriptor of the server sending the command.

Stratum 1720: Contains the stratum of the server sending the command.

Maximum Version Number 1730: Specifies the highest STP version number supported by the STP facility sending the command.

Required Version Number 1740: Specifies the STP version number currently active at the STP facility sending the command and is the version that must be used by the attached server for the ESP procedure to complete successfully. When not specified, the server sending the command is able to operate at any version up to and including the maximum-version number specified.

Stratum-1 Configuration Block 1750: Contains the stratum-1 configuration block for the server sending the message command.

The ESP message response block does not have any operation-dependent data. The following responses are valid for the operation:

Successful: The message command was successfully performed.

STP Not Enabled: The STP facility is installed, but not enabled at the attached server.

Busy: The message command cannot be performed at this time due to busy conditions or resource contention.

Invalid Operation Parameters: The message command contains invalid parameters.

Configuration Error: The message command contains a mismatched CTN ID.

Node Descriptor Error: The node descriptor in the ESP message command is invalid. The node descriptor value provided in the message command is stored in the link-information block at the receiving server.

Unsupported Version: The required-version number in the ESP message command is not supported by the receiving server. The required-version number provided in the message command is stored in the link-information block at the receiving server.

Stratum-1 Configuration Error: The stratum-1 configuration-information block in the ESP message command is not compatible with the stratum-1 configuration at the receiving server.

Self-Coupled Server: The node descriptor of the attached server is identical to the node descriptor of this server, indicating that this server is coupled to itself.

Takeover-Active State: The arbiter received an ESP command from the primary-stratum-1 server while the arbiter was in the takeover-active state and the primary specified itself as the active-stratum-1 server.

Allowable Paths Exceeded: The server can not support any additional STP paths.

CF Response: The response codes indicate that the STP facility is not supported at the attached server.

Remove STP Path

The remove-STP-path operation removes an established STP path to an attached server. The sending server sets the path link state to uninitialized as a result of the operation. The message command and message response do not include any operation-dependent data. Valid responses for the operation include:

Successful: The message command was successfully performed.

STP Not Enabled: The STP facility is installed, but not enabled at the attached server.

Invalid Operation Parameters: The message command contains invalid parameters.

Configuration Error: The message commands contains a mismatched CTN ID.

Path Not Established: The path is not established at the attached server.

CF Response: The response indicates that the STP facility is not supported at the attached server.

The sending server sets the path state to uninitialized, and the reason to indicate initialization-not-complete as a result of the operation, regardless of the response.

Set Arbiter Takeover Mode

The set-arbiter-takeover mode operation is issued to the arbiter server by the alternate-stratum-1 server to put the arbiter into takeover mode. The receiving server returns the arbiter takeover-state flag in the response block.

Figure 17B:
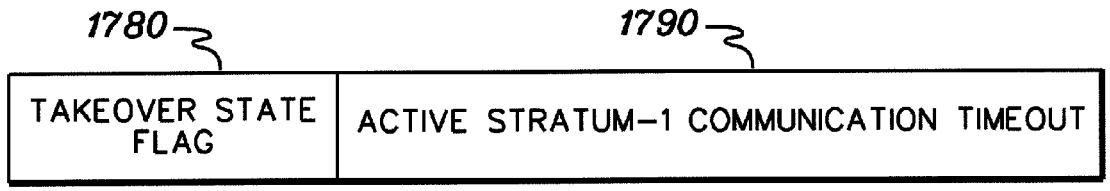
FIG. 17B depicts one embodiment of a set arbiter-takeover mode response in an operation-dependent area format, in accordance with an aspect of the present invention.

The message command operation-dependent data area has the format illustrated in FIG. 17B.

Active Stratum-1 Communication Timeout 1780: When set, the set-arbiter-takeover-mode message command is being issued because the inactive-stratum-1 server has recognized an active-stratum-1 timeout condition. When unset, the set-arbiter-takeover-mode message command is being issued because the inactive stratum-1 server has lost attachment to the active-stratum-1 server.

Valid response codes for the operation include:

Successful: The message command was successfully performed.

STP Not Enabled: The STP facility is installed, but not enabled at the attached servers.

Invalid Operation Parameters: The message command contains invalid parameters.

Configuration Error: The message commands contains a mismatched CTN ID.

Path Not Established: The path is not established at the attached server.

Invalid Command: The message command receiver is not a designated arbiter.

Invalid Sender: The message command server is not a designated alternate-stratum-1 server.

CF Response: The response codes indicate that the STP facility is not supported at the attached server.

Takeover State Flag 1790: When set, indicates that the arbiter has entered takeover mode and is in the takeover-active state. When unset, it indicates: the arbiter has entered takeover mode and is in the takeover-pending state; or the arbiter has not entered takeover mode.

Reset Arbiter Takeover Mode

The reset-arbiter takeover mode operation is issued to the arbiter server by the alternate-stratum-1 server to take the arbiter out of takeover mode. The message command operation-dependent area does not include any data. Valid responses for the operation include:

Successful: The message command was successfully performed.

STP Not Enabled: The STP facility is installed, but not enabled at the attached server.

Invalid Operation Parameters: The message command contains invalid parameters.

Configuration Error: The message commands contains a mismatched CTN ID.

Path Not Established: The path is not established at the attached server.

Invalid Command: The message command receiver is not a designated arbiter.

Invalid Sender: The message command server is not a designated alternate-stratum-1 server.

CF Response: The response codes indicate that the STP facility is not supported at the attached server.

Arbiter Takeover State Active

The arbiter-takeover-state-active operation is issued to the alternate-stratum-1 server by the arbiter to notify the alternate-stratum-1 server that the arbiter has entered the takeover-active state. The message command operation-dependent area does not include any information. Valid responses for the operation include:

Successful: The message command was successfully performed.

STP Not Enabled: The STP facility is installed, but not enabled at the attached server.

Invalid Operation Parameters: The message command contains invalid parameters.

Configuration Error: The message commands contains a mismatched CTN ID.

Path Not Established: The path is not established at the attached server.

Invalid Command: The message command server is not a designated arbiter.

Invalid Sender: The message command server is not a designated arbiter.

CF Response: The response codes indicate that the STP facility is not supported at the attached server.

In one embodiment, one or more aspects of the present invention can be executed in a processing environment that is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety. In such an environment instructions and/or logic, which is specified in the z/Architecture® and designed to execute on a z/Architecture® machine, is emulated to execute on an architecture other than the z/Architecture®. One example of this processing environment is described with reference to FIGS. 18-20.

Figure 18:
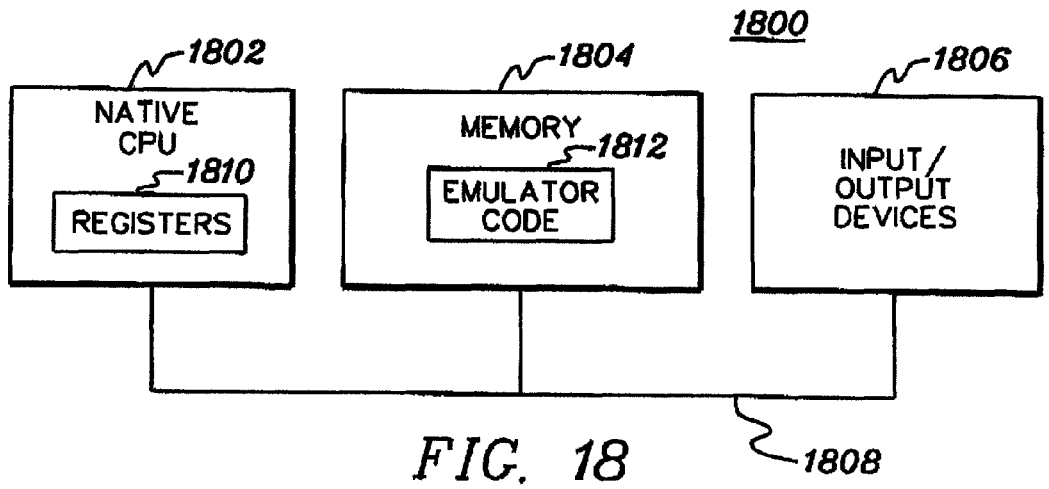
FIG. 18 depicts one embodiment of a processing environment to incorporate one or more aspects of the present invention.

Referring to FIG. 18, one embodiment of a processing environment to incorporate and use one or more aspects of the present invention is described. Processing environment 1800 includes, for instance, a native central processing unit 1802, a memory 1804 (e.g., main memory) and one or more input/output (I/O) devices 1806 coupled to one another via, for example, one or more buses 1808 and/or other connections. As examples, processing environment 1800 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 1802 includes one or more native registers 1810, such as one or more general purpose registers and/or one or more special purpose registers, used during processing within the environment. These registers include information that represent the state of the environment at any particular point in time.

Moreover, native central processing unit 1802 executes instructions and code that are stored in memory 1804. In one particular example, the central processing unit executes emulator code 1812 stored in memory 1804. This code enables the processing environment configured in one architecture to emulate another architecture. For instance, emulator code 1812 allows machines based on architectures other than the z/Architecture, such as Power PC® processors, pSeries® servers, xSeries® servers, HP Superdome® servers, or others to emulate the z/Architecture® and to execute software and instructions developed based on the z/Architecture®.

Figure 19:
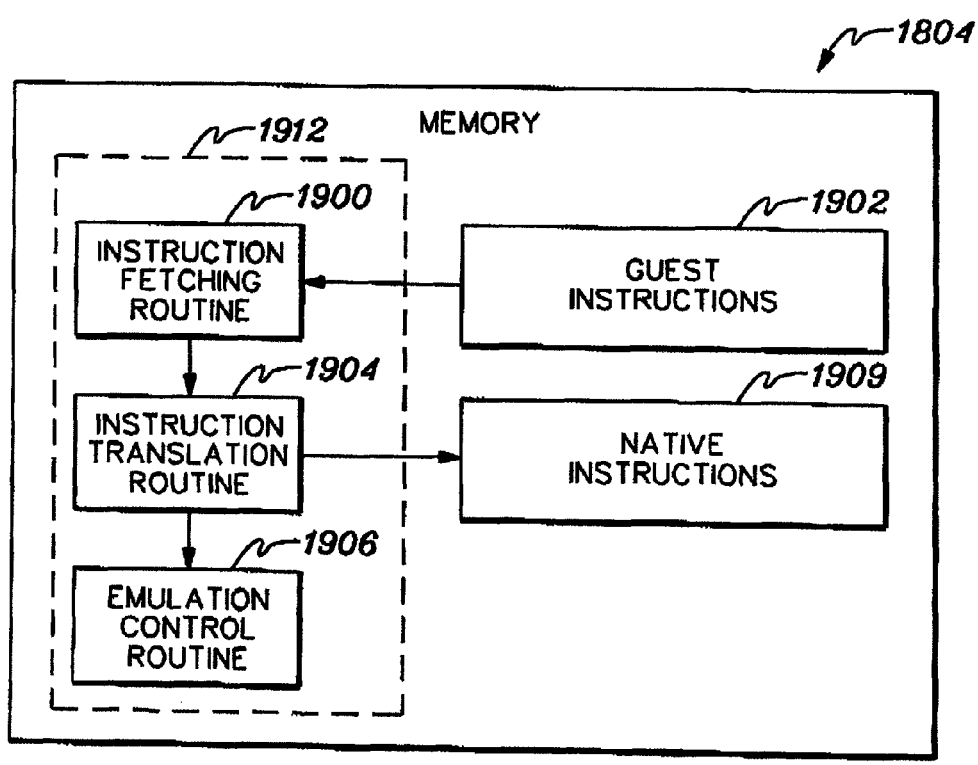
FIG. 19 depicts further details of the memory of FIG. 18, in accordance with an aspect of the present invention.

Further details relating to emulator code 1812 are described with reference to FIG. 19. Guest instructions 1902 comprise software instructions (e.g., machine instructions) that were developed to be executed in an architecture other than that of native CPU 1802 (FIG. 18). For example, guest instructions 1902 may have been designed to execute on z/Architecture® processor 902, but are instead being emulated on native CPU 1802 (which may be for example an Intel® Itanium® 2 processor). In one example, emulator code 1812 (FIG. 18) includes an instruction fetching routine 1900 to obtain one or more guest instructions 1902 from memory 1804, and to optionally provide local buffering for the instruction obtained.

Emulator code 1812 further includes an instruction translation routine 1904 to determine the type of guest instruction that has been obtained and to provide one or more native instructions 1909 that correspond to the guest instruction. In one example, the providing includes creating during, for instance, a translation process, a native stream of instructions for a given guest instruction. This includes identifying the function and creating the equivalent native instructions. In a further example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

Emulator code 1812 further includes an emulation control routine 1906 to cause the native instructions to be executed. Emulation control routine 1906 may cause native CPU 1802 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 1909 may include loading data into a register from memory 1804; storing data back to memory from a register; or performing some type of arithmetic or logical operation, as determined by the translation routine. Each routine is, for instance, implemented in software, which is stored in memory and executed by the native central processing unit 1802. In other examples, one or more of the routines or operations are implemented in firmware, hardware, software or some combination thereof. The registers of the emulated guest processor may be emulated using the registers 1810 of the native CPU or by using locations in memory 1804. In embodiments, the guest instructions 1902, native instructions 1909, and emulation code 1812 may reside in the same memory or may be dispersed among different memory devices.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 20:
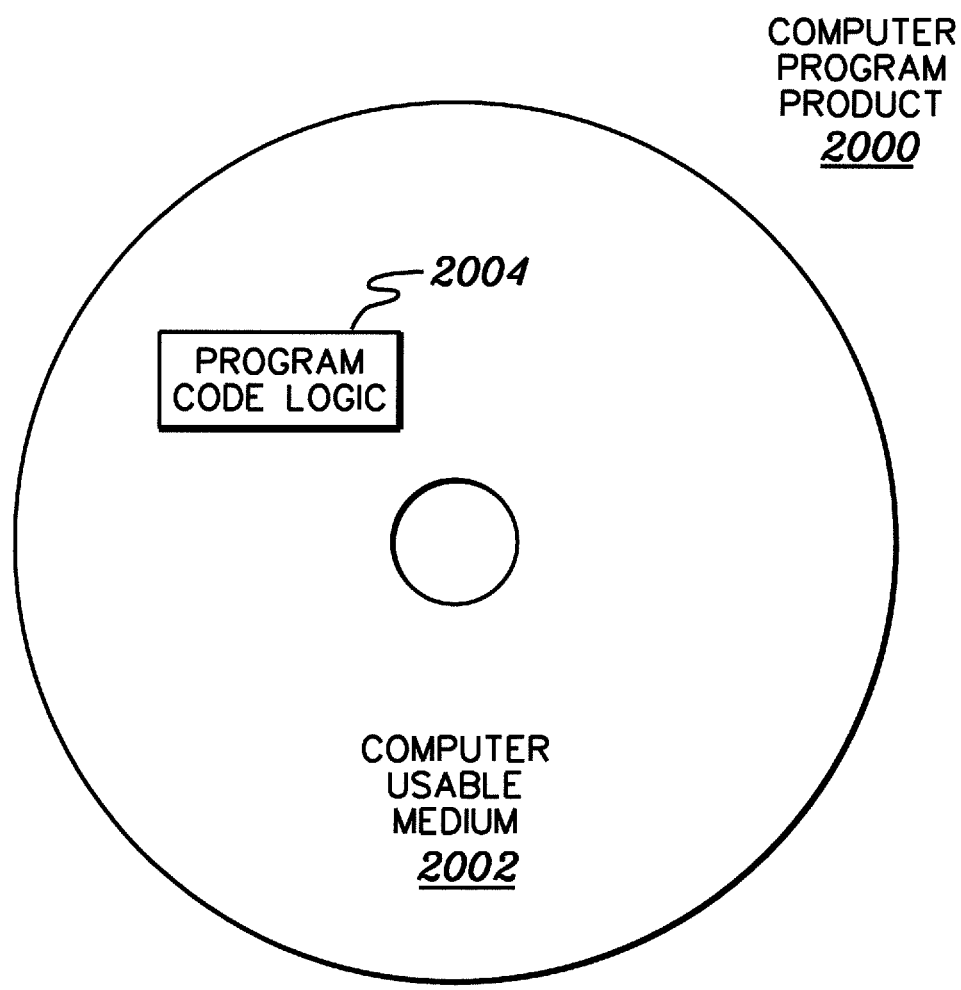
FIG. 20 depicts one example of a computer program product to incorporate one or more aspects of the present invention.

One example of an article of manufacture or a computer program product incorporating one or more aspects of the present invention is described with reference to FIG. 20. A computer program product 2000 includes, for instance, one or more computer usable media 2002 to store computer readable program code means or logic 2004 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Described herein are capabilities that facilitate the maintaining of time synchronization by multiple distinct computing systems to form a Coordinated Timing Network. Servers in the timing network make use of the Server Time Protocol to pass timekeeping information over existing high speed data links between systems that provide the capability for the time of day clocks at each system to be synchronized to the accuracy required in today's high end computing systems. The use of STP over high-speed, low latency links provides the capability to synchronize all systems in the CTN to the accuracy of, for instance, a few microseconds when based on a reference time provided by a single server.

STP provides the capability to set and maintain timekeeping information within the CTN, such as time zone, daylight savings time offset, and a leap seconds offset. The information may be updated within the CTN in a scheduled and coherent fashion, such that all changes occur at the same time at all servers in the CTN. This prevents potential system exposures and disruptions that occur when these parameters are updated in a haphazard fashion, creating time setting discrepancies between computers.

CTN parameters may be set and read by an operator via the STP console interface. CTN parameters include server connectivity, local time information, such as time zone and daylight savings time, and the leap seconds required to compute the UTC. The console itself is any element that provides an operator interface to display and set CTN parameters, and that has the capability to communicate with the STP facility.

Although one or more examples have been provided herein, these are only examples. Many variations are possible without departing from the spirit of the present invention. For instance, processing environments other than the examples provided herein may include and/or benefit from one or more aspects of the present invention. As an example. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

Moreover, although various control blocks have been described, each of these control blocks can include additional, less and/or different information. The location within the control block and the size of each field within the control block can vary for different embodiments.

As used herein, the term "obtaining" includes, but is not limited to, fetching, receiving, having, providing, being provided, creating, developing, etc.

Additional information regarding timing networks is provided in the following patent applications, each of which is hereby incorporated herein by reference in its entirety: U.S. Provisional Ser. No. 60/887,584 entitled "Facilitating Synchronization Of Servers In A Coordinated Timing Network", filed Jan. 31, 2007; U.S. Ser. No. 11/876,152 entitled "Facilitating Synchronization Of Servers In A Coordinated Timing Network", filed Oct. 22, 2007; U.S. Ser. No. 11/876,199 entitled "Definition Of A Primary Active Server In A Coordinated Timing Network", filed Oct. 22, 2007; U.S. Provisional Ser. No. 60/887,562 entitled "Defining A Stratum-1 Configuration In A Coordinated Timing Network", filed Jan. 31, 2007; U.S. Ser. No. 11,876,240 entitled "Employing Configuration Information To Determine The Role Of A Server In A Coordinated Timing Network", filed Oct. 22, 2007; U.S. Provisional Ser. No. 60/887,576 entitled "Method And System For Establishing A Logical Path Between Servers In A Coordinated Timing Network", filed Jan. 31, 2007; U.S. Ser. No. 11,876,272 entitled "Establishing A Logical Path Between Servers In A Coordinated Timing Network", filed Oct. 22, 2007; U.S. Provisional Ser. No. 60/887,586 entitled "Facilitating Recovery In A Coordinated Timing Network", filed Jan. 31, 2007; U.S. Ser. No. 11/876,323 entitled "Facilitating Recovery In A Coordinated Timing Network, And Methods Therefor", filed Oct. 22, 2007; U.S. Provisional Ser. No. 60/887,544 entitled "Channel Subsystem Server Time Protocol Commands", filed Jan. 31, 2007; U.S. Ser. No. 11/876,796 entitled Channel Subsystem Server Time Protocol Commands and System Therefor", filed Oct. 23, 2007; U.S. Provisional Ser. No. 60/887,512 entitled "Server Time Protocol Messages And Methods", filed Jan. 31, 2007; U.S. Ser. No. 11/940,558 entitled "Server Time Protocol Control Messages and Methods", filed herewith; U.S. Ser. No. 11/468,352, entitled "Coordinated Timing Network Configuration Parameter Update Procedure," filed Aug. 30, 2006; U.S. Ser. No. 11/460,025, entitled "Directly Obtaining By Application Programs Information Usable In Determining Clock Accuracy," filed Jul. 26, 2006; U.S. Ser. No. 11/223,886, entitled "System And Method For TOD-Clock Steering;" U.S. Ser. No. 11/532,168, entitled "Synchronization Signal For TOD-Clock Steering Adjustment;" U.S. Ser. No. 11/468,501, entitled "Managing Data Access Via A Loop Only If Changed Locking Facility;" U.S. Ser. No. 11/223,878, entitled Clock Filter Dispersion;" U.S. Ser. No. 11/223,876, entitled "Method And System For Clock Skew And Offset Estimation;" U.S. Ser. No. 11/223,577, entitled "Use Of T4 Timestamps To Calculate Clock Offset And Skew;" and U.S. Ser. No. 11/223,642 entitled "System And Method For Calibrating A TOD Clock."

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the claims.

What is claimed is:

1. A method of exchanging messages for facilitating synchronization of processing units of a timing network, the method comprising:
  receiving an exchange time parameters (XTP) message command at a second processing unit generated by a first processing unit, the XTP message command including a message command transmit timestamp field set by the first processing unit and a message command receive timestamp field unset by the first processing unit;
  setting the message command receive timestamp field in the XTP message command with the time that the XTP message command is received at the second processing unit; and
  generating at the second processing unit an XTP message response to be sent to the first processing unit, the XTP message response including the message command transmit timestamp set by the first processing unit and the message command receive timestamp set by the second processing unit obtained from the XTP message command;
    wherein the XTP message command further comprises a message header dependent on a type of data link used to implement a server time protocol link between the first processing unit and the second processing unit, and a coordinated timing network (CTN) identifier of a timing network to which the first processing unit belongs;
    wherein the XTP message command is transmitted to the second processing unit over the server time protocol link, and the message command transmit time stamp field is set by the first processing unit using a current time of day clock of the first processing unit, and is set immediately prior to transmitting of the XTP message command; and
    wherein generating the XTP message response at the second processing unit comprises checking whether the CTN identifier received with the XTP message command matches a CTN identifier of a timing network to which the second processing unit belongs.

2. The method of claim 1, further comprising generating the XTP message command by the first processing unit, the generating including setting the message command transmit timestamp field at the first processing unit using a time of day clock of the first processing unit, and wherein setting the message-command-receive-timestamp field in the XTP message command by the second processing unit comprises setting the message command receive timestamp field in the XTP message command with the time that the XTP message command is received at the second processing unit using a time of day clock of the second processing unit.

3. The method of claim 1, wherein generating the XTP message response at the second processing unit further comprises including a message response transmit timestamp field set by the second processing unit and a message response receive timestamp field which is unset by the second processing unit.

4. The method of claim 3, further comprising transmitting the XTP message response from the second processing unit to the first processing unit, and setting the message response receive timestamp field in the XTP message response at the first processing unit with the time that the XTP message response is received at the first processing unit.

5. The method of claim 3, wherein the XTP message response to be sent to the first processing unit further comprises:
  a message header dependent on a type of data link used to implement a server time protocol link between the first processing unit and the second processing unit across which the XTP message command and XTP message response are transmitted;
  a response code indicative of the results of the attempt to execute the message command;

an XTP format, specifying the format of a format-dependent-area in the XTP message response;
a CTN parameter key indicating whether the contents of the format-dependent-area have changed;
a stratum set to the level of the second processing unit sending the XTP message response;
a timing mode set to the timing-mode of the second processing unit sending the XTP message response;
a timing state set to the timing state of the second processing unit sending the XTP message response;
a local clock server indication specifying whether the second processing unit sending the XTP message response is configured as a local-clock processing unit;
the CTN ID of the timing network to which the second processing unit sending the XTP message response belongs;
a current primary reference time (PRT) correction steering rate for the coordinated timing network;
a message interval set to the outgoing-message-interval field from timekeeping parameters set by the second processing unit;
a base steering rate set to the base-steering rate of the second processing unit sending the XTP message response;
a root delay set to a coordinated server time (CST)-round-trip delay at the second processing unit sending the XTP message response;
a root dispersion set to a CST-clock dispersion at the second processing unit sending the XTP message response;
a reference identifier set to a CST-reference ID at the second processing unit sending the XTP message response;
a reference timestamp set to a CST-reference timestamp at the second processing unit sending the XTP message response; and
an XTP format dependent data field set to one of multiple possible message response formats.

6. The method of claim 4, wherein the XTP message response further comprises an XTP format dependent data field set to one of multiple possible message response formats, the multiple possible message response formats comprising:
a first message response format used to deliver general CTN parameter information, the first message response format including an XTP general format, a primary reference time (PRT) correction steering block, a new CTN ID block, a leap second offset information block, and a total time offset;
a second message response format used to deliver a new stratum-1-configuration-information block, and if specified, a new CTN ID, the second message response format including an XTP general format, and a new stratum-1-configuration-information block; and
a third message response format used to deliver a time control parameter, the third message response format including an XTP general format and a time-control parameter information block.

7. The method of claim 4, further comprising processing the XTP message response at the first processing unit upon receipt thereof, the processing comprising:
adding the XTP message response to an XTP trace array and setting an entry code, wherein setting the entry code comprises:
setting the entry code to a first value to indicate invalid timestamp data if any timestamp contains all 0s or a timing state received from the second processing unit is the stopped state;
setting the entry code to a second value to indicate that timestamp data is valid, but should not be used to determine a usable clock source if a message-response timing state indicates unsynchronized, a message-response stratum of the second processing unit equals a maximum-stratum parameter, or a stratum level of the first processing unit is non-zero and the message-response stratum of the second processing unit is greater than the stratum level of the first processing unit; and
setting the entry code to a third value if neither the first or second value are set, the third value indicating that timestamp data is valid, and when the third value is set the method further comprises updating timekeeping-reference data associated with the second processing unit from information in the XTP message response, performing clock filtering-and-selection and updating; and
wherein when the first processing unit is in the synchronized state, checking data in a format dependent data field of a most recent valid time-keeping message response for updates, and if detected, using that data to update the first processing unit's CTN parameters.

8. A computer program product for facilitating synchronization of processing units of a timing network, the computer program product comprising:
a non-transitory storage medium readable by a processing circuit and storing instructions for execution by the processing circuit for performing a method comprising:
receiving an exchange time parameters (XTP) message command at a second processing unit generated by a first processing unit, the XTP message command including a message command transmit timestamp field set by the first processing unit and a message command receive timestamp field unset by the first processing unit;
setting the message command receive timestamp field in the XTP message command with the time that the XTP message command is received at the second processing unit; and
generating at the second processing unit an XTP message response to be sent to the first processing unit, the XTP message response including the message command transmit timestamp set by the first processing unit and the message command receive timestamp set by the second processing unit obtained from the XTP message command;
wherein the XTP message command further comprises a message header dependent on a type of data link used to implement a server time protocol link between the first processing unit and the second processing unit, and a coordinated timing network (CTN) identifier of a timing network to which the first processing unit belongs;
wherein the XTP message command is transmitted to the second processing unit over the server time protocol link, and the message command transmit time stamp field is set by the first processing unit using a current time of day clock of the first processing unit, and is set immediately prior to transmitting of the XTP message command; and
wherein generating the XTP message response at the second processing unit comprises checking whether the CTN identifier received with the XTP message command matches a CTN identifier of a timing network to which the second processing unit belongs.

9. The computer program product of claim 8, further comprising generating the XTP message command by the first processing unit, the generating including setting the message command transmit timestamp field at the first processing unit using a time of day clock of the first processing unit, and wherein setting the message-command-receive-timestamp field in the XTP message command by the second processing unit comprises setting the message command receive timestamp field in the XTP message command with the time that the XTP message command is received at the second processing unit using a time of day clock of the second processing unit.

10. The computer program product of claim 8, wherein generating the XTP message response at the second processing unit further comprises including a message response transmit timestamp field set by the second processing unit and a message response receive timestamp field which is unset by the second processing unit.

11. The computer program product of claim 10, further comprising transmitting the XTP message response from the second processing unit to the first processing unit, and setting the message response receive timestamp field in the XTP Message response at the first processing unit with the time that the XTP message response is received at the first processing unit.

12. The computer program product of claim 10, wherein the XTP message response to be sent to the first processing unit further comprises:
- a message header dependent on a type of data link used to implement a server time protocol link between the first processing unit and the second processing unit across which the XTP message command and XTP message response are transmitted;
- a response code indicative of the results of the attempt to execute the message command;
- an XTP format specifying the format of a format-dependent-area in the XTP message response;
- a CTN parameter key indicating whether the contents of the format-dependent-area have changed;
- a stratum set to the level of the second processing unit sending the XTP message response;
- a timing mode set to the timing-mode of the second processing unit sending the XTP message response;
- a timing state set to the timing state of the second processing unit sending the XTP message response;
- a local clock server indication specifying whether the second processing unit sending the XTP message response is configured as a local-clock processing unit;
- the CTN ID of the timing network to which the second processing unit sending the XTP message response belongs;
- a current primary reference time (PRT) correction steering rate for the coordinated timing network;
- a message interval set to the outgoing-message-interval field from timekeeping parameters set by the second processing unit;
- a base steering rate set to the base-steering rate of the second processing unit sending the XTP message response;
- a root delay set to a coordinated server time (CST)-round-trip delay at the second processing unit sending the XTP message response;
- a root dispersion set to a CST-clock dispersion at the second processing unit sending the XTP message response;
- a reference identifier set to a CST-reference ID at the second processing unit sending the XTP message response;
- a reference timestamp set to a CST-reference timestamp at the second processing unit sending the XTP message response; and
- an XTP format dependent data field set to one of multiple possible message response formats.

13. The computer program product of claim 11, wherein the XTP message response further comprises in XTP format dependent data field set to one of multiple possible message response formats, the multiple possible message response formats comprising:
- a first message response format used to deliver general CTN parameter information, the first message response format including an XTP general format, a primary reference time (PRT) correction steering block, a new CTN ID block, a leap second offset information block, and a total time offset;
- a second message response format used to deliver a new stratum-1-configuration-information block, and if specified, a new CTN ID, the second message response format including an XTP general format, and a new stratum-1 configuration information block; and
- a third message response format used to deliver a time control parameter, the third message response format including an XTP general format and a time-control parameter information block.

14. The computer program product of claim 11, further comprising processing the XTP message response at the first processing unit upon receipt thereof, the processing comprising:
- adding the XTP message response to an XTP trace array and setting an entry code, wherein setting the entry code comprises:
  - setting the entry code to a first value to indicate invalid timestamp data if any timestamp contains all 0s or a timing state received from the second processing unit is a stopped state;
  - setting the entry code to a second value to indicate that timestamp data is valid, but should not be used to determine a usable clock source if a message-response timing state indicates unsynchronized, a message-response stratum of the second processing unit equals a maximum stratum parameter, or a stratum level of the first processing unit is non-zero and the message-response stratum of the second processing unit is greater than the stratum level of the first processing unit; and
  - setting the entry code to a third value if neither the first or second value are set, the third value indicating that timestamp data is valid, and when the third value is set the method further comprises updating timekeeping-reference data associated with the second processing unit from information in the XTP message response, performing clock filtering-and-selection and clock updating; and
- wherein when the first processing unit is in the synchronized state, checking data in a format dependent data field of a most recent valid time keeping message response for updates, and if detected, using that data to update the first processing unit's CTN parameters.

15. A system to facilitate exchange of messages for synchronization of processing units of a timing network, the system comprising:
- a memory; and
- a processor in communications with the memory, wherein the computer system is configured to perform a method, the method comprising:

receiving an exchange time parameters (XTP) message command at a second processing unit of a coordinated timing network generated by a first processing unit thereof, the XTP message command including a message command transmit timestamp field set by the first processing unit and a message command receive timestamp field unset by the first processing unit;

setting the message command receive timestamp field in the XTP message command with the time that the XTP message command is received at the second processing unit;

generating at the second processing unit an XTP message response to be sent to the first processing unit, the XTP message response including the message command transmit timestamp set by the first processing unit and the message command receive timestamp set by the second processing unit obtained from the XTP message command;

wherein the XTP message command further comprises a message header dependent on a type of data link used to implement a server time protocol link between the first processing unit and the second processing unit, and a coordinated timing network (CTN) identifier of a timing network to which the first processing unit belongs;

wherein the XTP message command is transmitted to the second processing unit over the server time protocol link, and the message command transmit timestamp field is set by the first processing unit using a current time of day clock of the first processing unit, and is set immediately prior to transmitting of the XTP message command; and wherein generating the XTP message response at the second processing unit comprises checking whether the CTN identifier received with the XTP message command matches a CTN identifier of a timing network to which the second processing unit belongs.

16. The system of claim 15, further comprising generating the XTP message command by the first processing unit, the generating including setting the message command transmit timestamp field at the first processing unit using a time of day clock of the first processing unit, and wherein setting the message-command-receive-timestamp field in the XTP message command by the second processing unit comprises setting the message command receive timestamp field in the XTP message command with the time that the XTP message command is received at the second processing unit using a time of day clock of the second processing unit.

17. The system of claim 15, wherein generating the XTP message response at the second processing unit further comprises the second processing unit including a message response transmit timestamp field set by the second processing unit and a message response receive timestamp field which is unset by the second processing unit, and further comprising the second processing unit transmitting the XTP message response from the second processing unit to the first processing unit, and setting the message response receive timestamp field in the XTP message response at the first processing unit with the time that the XTP message response is received at the first processing unit.

* * * * *